(12) United States Patent
Fontaine et al.

(10) Patent No.: US 11,401,354 B2
(45) Date of Patent: Aug. 2, 2022

(54) BIS-BIPHENYL-PHENOXY CATALYSTS FOR OLEFIN POLYMERIZATION

(71) Applicant: Dow Global Technologies LLC, Midland, MI (US)

(72) Inventors: Philip P. Fontaine, Pearland, TX (US); Hien Q. Do, Sugar Land, TX (US); Johnathan E. DeLorbe, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 371 days.

(21) Appl. No.: 16/497,613

(22) PCT Filed: Mar. 29, 2018

(86) PCT No.: PCT/US2018/025176
§ 371 (c)(1),
(2) Date: Sep. 25, 2019

(87) PCT Pub. No.: WO2018/183700
PCT Pub. Date: Oct. 4, 2018

(65) Prior Publication Data
US 2020/0017611 A1  Jan. 16, 2020

Related U.S. Application Data

(60) Provisional application No. 62/479,897, filed on Mar. 31, 2017.

(51) Int. Cl.
*C07F 7/00*  (2006.01)
*C08F 4/64*  (2006.01)
(Continued)

(52) U.S. Cl.
CPC ............ *C08F 4/64193* (2013.01); *C08F 2/06* (2013.01); *C08F 4/65908* (2013.01); *C08F 4/65912* (2013.01); *C08F 210/16* (2013.01)

(58) Field of Classification Search
CPC ....... C07F 7/00; C08F 4/64193; C08F 210/16
See application file for complete search history.

(56) References Cited

U.S. PATENT DOCUMENTS 8,609,794 B2   12/2013  Klosin et al.
9,527,940 B2   12/2016  Demirors et al.
(Continued)

FOREIGN PATENT DOCUMENTS

EP   2473538 B1    7/2017
WO   2011146044 A1  11/2011
(Continued)

OTHER PUBLICATIONS

U.S. Notice of Allowance and Fee(s) Due dated Aug. 20, 2021 pertaining to U.S. Appl. No. 16/497,542, filed Sep. 25, 2019, 8 pages.
(Continued)

*Primary Examiner* — Caixia Lu
(74) *Attorney, Agent, or Firm* — Dinsmore & Shohl LLP

(57) ABSTRACT

Embodiments are directed to a catalyst system comprising metal ligand complexes and processes for polyolefin polymerization using the metal ligand complex having the following structure:

(Continued)

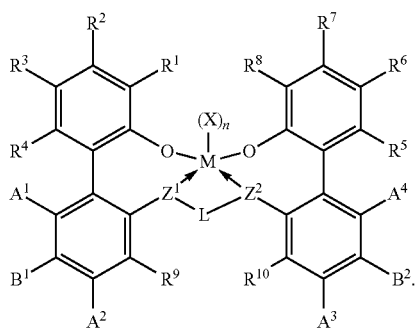

20 Claims, 1 Drawing Sheet

(51) Int. Cl.
C08F 210/16 (2006.01)
C08F 2/06 (2006.01)
C08F 4/659 (2006.01)

(56) References Cited

U.S. PATENT DOCUMENTS

| | | | |
|---|---|---|---|
| 9,527,941 B2 | 12/2016 | Demirors et al. | |
| 9,605,098 B2 | 3/2017 | Klosin et al. | |
| 9,751,998 B2 | 9/2017 | Klosin et al. | |
| 10,214,602 B2 | 2/2019 | Demirors et al. | |
| 10,301,412 B2 * | 5/2019 | Klosin | C08F 210/16 |
| 10,351,646 B2 | 7/2019 | Fontaine et al. | |
| 10,544,244 B2 * | 1/2020 | Faler | C08F 210/16 |
| 10,597,473 B2 | 3/2020 | Figueroa et al. | |
| 10,815,255 B2 * | 10/2020 | Faler | C07C 41/30 |
| 10,870,713 B2 | 12/2020 | Figueroa et al. | |
| 2011/0282018 A1 * | 11/2011 | Klosin | C08F 10/00 |
| | | | 526/170 |
| 2014/0163186 A1 | 6/2014 | Klosin et al. | |
| 2015/0337062 A1 | 11/2015 | Demirors et al. | |
| 2015/0344601 A1 | 12/2015 | Demirors et al. | |
| 2017/0101493 A1 | 4/2017 | Fontaine et al. | |
| 2017/0101494 A1 | 4/2017 | Fontaine et al. | |
| 2018/0194871 A1 | 7/2018 | Figueroa et al. | |
| 2018/0265604 A1 | 9/2018 | Figueroa et al. | |
| 2018/0282452 A1 | 10/2018 | Fontaine et al. | |
| 2020/0109220 A1 * | 4/2020 | Do | C08F 210/16 |

FOREIGN PATENT DOCUMENTS

| | | |
|---|---|---|
| WO | 2014105411 A1 | 7/2014 |
| WO | 2014105413 A1 | 7/2014 |
| WO | 2016003878 A1 | 1/2016 |
| WO | 2016089935 A1 | 6/2016 |

OTHER PUBLICATIONS

International Search Report and Written Opinion pertaining to PCT/US2018/023521 dated Jul. 13, 2018.
International Search Report and Written Opinion pertaining to PCT/US2018/025176 dated Jul. 23, 2018.
Office Action dated Mar. 16, 2021 pertaining to U.S. Appl. No. 16/497,542, filed Sep. 25, 2019, 10 pgs.

\* cited by examiner

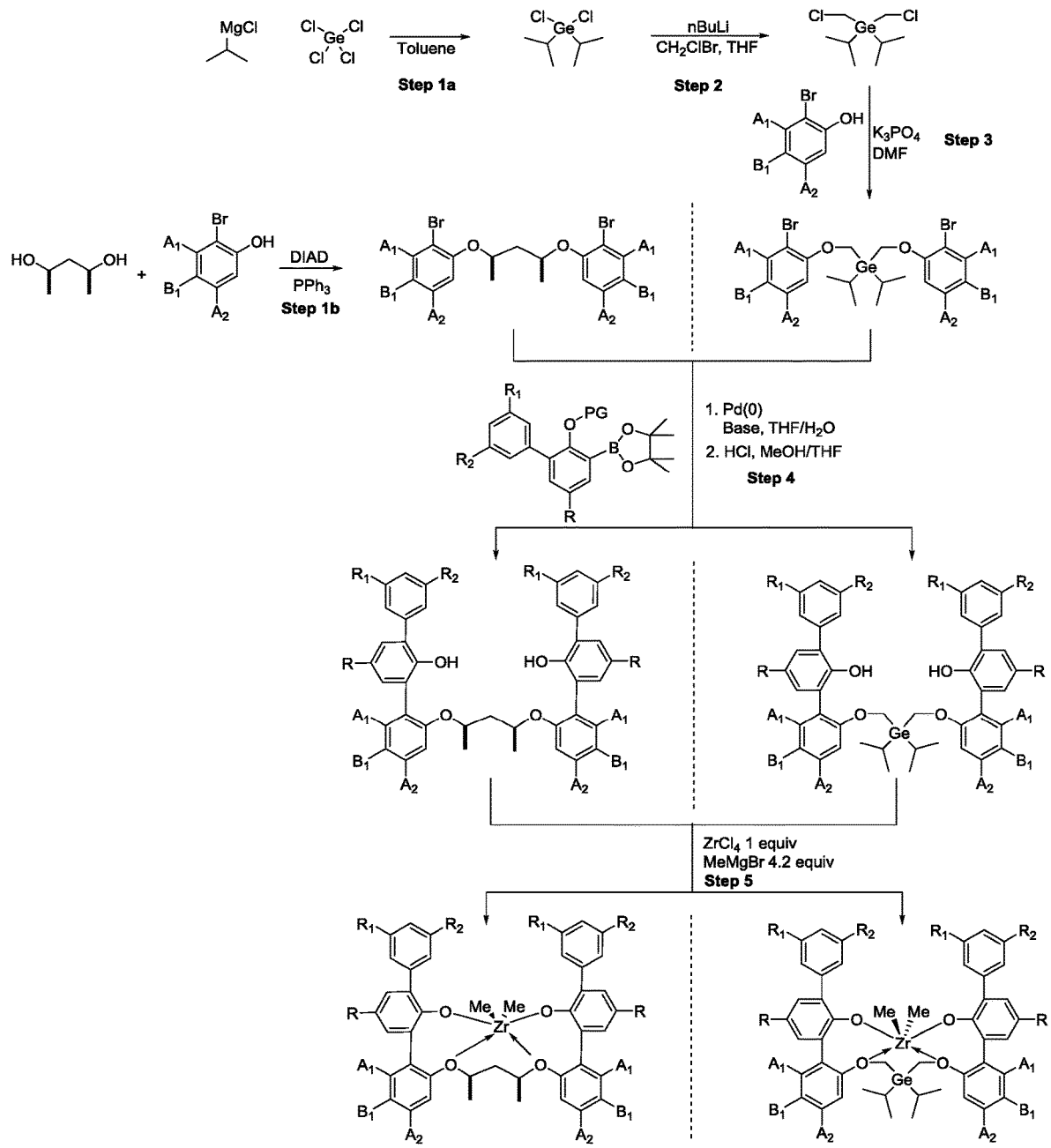

BIS-BIPHENYL-PHENOXY CATALYSTS FOR OLEFIN POLYMERIZATION

CROSS-REFERENCE TO RELATED APPLICATION

This application claims priority to U.S. Provisional Patent Application No. 62/479,897 filed Mar. 31, 2017, entitled "Bis-Biphenyl-Phenoxy Catalysts For Olefin Polymerization", the contents of which are hereby incorporated by reference in its entirety.

TECHNICAL FIELD

Embodiments of the present disclosure generally relate to olefin polymerization catalyst systems and processes and, more specifically to bis-biphenyl-phenoxy catalyst systems for olefin polymerization and to olefin polymerization processes incorporating the catalyst systems.

BACKGROUND

Olefin-based polymers such as polyethylene, ethylene-based polymer, polypropylene, and propylene-based polymer are produced via various catalyst systems. Selection of such catalyst systems used in the polymerization process of the olefin-based polymers is an important factor contributing to the characteristics and properties of such olefin-based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and optionally one or more co-monomers are present in liquid diluents (such as solvents), such as an alkane or isoalkane, for example isobutane. Hydrogen may also be added to the reactor. The catalyst systems for producing polyethylene may typically comprise a chromium-based catalyst system, a Ziegler-Natta catalyst system, and/or a molecular (either metallocene or non-metallocene molecular) catalyst system. The reactants in the diluent and the catalyst system are circulated at an elevated polymerization temperature around the reactor, thereby producing polyethylene homopolymer or copolymer. Either periodically or continuously, part of the reaction mixture, including the polyethylene product dissolved in the diluent, together with unreacted ethylene and one or more optional co-monomers, is removed from the reactor. The reaction mixture when removed from the reactor may be processed to remove the polyethylene product from the diluent and the unreacted reactants, with the diluent and unreacted reactants typically being recycled back into the reactor. Alternatively, the reaction mixture may be sent to a second reactor serially connected to the first reactor where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

According to some embodiments, a catalyst system includes a metal-ligand complex according to formula (I):

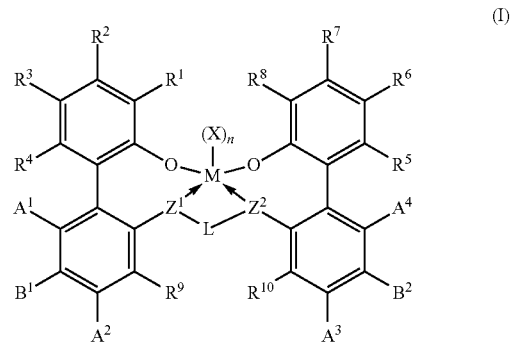

(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; $R^1$ and $R^8$ are independently selected from the group consisting of —H, ($C_1$-$C_{40}$)hydrocarbyl, ($C_1$-$C_{40}$) heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

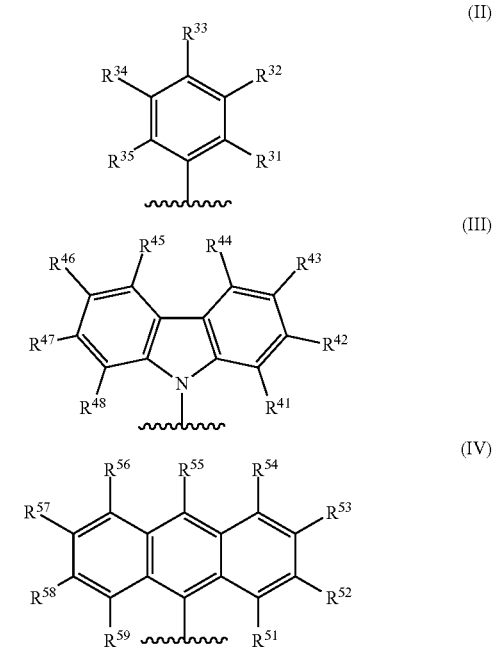

(II)

(III)

(IV)

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having formula (II), formula (III), or formula (IV).

In formula (I), each of $R^{2-4}$, $R^{5-7}$, and $R^{9-10}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^C$)$_2$NC(O)—, halogen, and —H.

In formula (I), each of $A^{1-4}$ is independently selected from halogen or —H, provided at least one of $A^1$ or $A^2$ is halogen and at least one of $A^3$ or $A^4$ is halogen. Each of $B^{1-2}$ is independently selected from (C$_1$-C$_{40}$)alkyl, —N($R^N$)$_2$, —Si($R^C$)$_3$, or —O$R^C$. L is (C$_2$-C$_{40}$)hydrocarbylene or (C$_2$-C$_{40}$)heterohydrocarbylene. In formula (I), each $R^C$, $R^P$, and $R^N$ in formula (I) is independently a (C$_1$-C$_{30}$)hydrocarbyl, (C$_1$-C$_{30}$)heterohydrocarbyl), or —H.

BRIEF DESCRIPTION OF THE FIGURE

The FIGURE is a synthetic scheme for the synthesis of metal-ligand complexes.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

R, Z, M, X and n: as defined above; Me: methyl; Et: ethyl; Ph: phenyl; Bn: benzyl; i-Pr: iso-propyl; n-Oct: n-octyl; t-Bu: tert-butyl; t-Oct: tert-octyl (2,4,4-trimethylpent-2-yl); Ts: toluene sulfonate; THF: tetrahydrofuran; Et$_2$O: diethyl ether; MeOH: methanol; DMA: dimethylacetamide; DME: dimethoxyethane; CH$_2$Cl$_2$ or DCM dichloromethane; CCl$_4$: carbon tetrachloride; EtOH: ethanol; CH$_3$CN: acetonitrile; EtOAc: ethyl acetate; C$_6$D$_6$: deuterated benzene or benzene-d6: CDCl$_3$: deuterated chloroform; DMSO-d6: deuterated dimethylsulfoxide; DBA: dibenzylideneacetone; PPh$_3$ triphenylphosphine; tBu$_3$P: tri-t-butylphosphine; tBu$_3$P Pd G2:

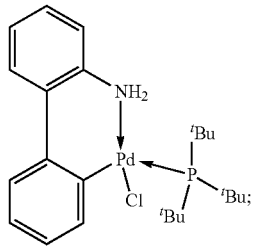

SiO$_2$: silica gel; Me$_4$Si: Tetramethylsilane; NaOH: sodium hydroxide; HCl: hydrochloric acid; NaHCO$_3$: sodium bicarbonate; NaOtBu: sodium tert-butoxide; K$_3$PO$_4$: potassium phosphate tribasic; brine: saturated aqueous sodium chloride; Na$_2$SO$_4$: sodium sulfate; MgSO$_4$: magnesium sulfate; n-BuLi: n-butyllithium; CuI: copper(I) iodide; Cs$_2$CO$_3$: cesium carbonate; HfCl$_4$: hafnium(IV) chloride; HfBn$_4$: hafnium(IV) tetrabenzyl; ZrCl$_4$ zirconium(IV) chloride; ZrBn$_4$: zirconium(IV) tetrabenzyl; N$_2$: nitrogen gas; PhMe: toluene; MAO: methylaluminoxane; MMAO: modified methylaluminoxane; PTFE polytetrafluoroethylene; GC: gas chromatography; LC: liquid chromatography; NMR: nuclear magnetic resonance; HRMS: high resolution mass spectrometry; mmol: millimoles; g/mol: grams per mole; mL: milliliters; M: molar; N: normal; min: minutes; h: hours; d: days; equiv: equivalence.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.) A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "(C$_x$-C$_y$)" means that the unsubstituted form of the chemical group has from x carbon atoms to y carbon atoms, inclusive of x and y. For example, a (C$_1$-C$_{40}$)alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "(C$_x$-C$_y$)" parenthetical may contain more than y carbon atoms depending on the identity of any groups $R^S$. For example, a "(C$_1$-C$_{40}$)alkyl substituted with exactly one group $R^S$, where $R^S$ is phenyl (—C$_6$H$_5$)" may contain from 7 to 46 carbon atoms. Thus, in general when a chemical group defined using the "(C$_x$-C$_y$)" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

In some embodiments, each of the chemical groups (e.g., X, R, Y, etc.) of the metal-ligand complex of formula (I) may be unsubstituted having no $R^S$ substituents. In other embodiments, at least one of the chemical groups of the metal-ligand complex of formula (I) may independently contain one or more than one $R^S$. In some embodiments, the sum total of $R^S$ in the chemical groups of the metal-ligand complex of formula (I) does not exceed 20. In other embodiments, the sum total of $R^S$ in the chemical groups, R, X, Y, and Z, does not exceed 10. For example, if each $R^{1-5}$ was substituted with two $R^S$, then X, Y and Z cannot be substituted with an $R^S$. In another embodiment, the sum total of $R^S$ in the chemical groups of the metal-ligand complex of formula (I) may not exceed 5 $R^S$. When two or more than two $R^S$ are bonded to a same chemical group of the metal-ligand complex of formula (I), each $R^S$ is independently bonded to the same or different carbon atom or heteroatom and may include persubstitution of the chemical group.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H—) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified have identical meanings.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (having three carbon atoms or more, and including monocyclic and polycyclic, fused and non-fused polycyclic, including bicyclic) or acyclic, and is substituted by one or more $R^S$ or unsubstituted.

In this disclosure, a $(C_1-C_{40})$hydrocarbyl may be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—CH$_2$—C$_6$H$_5$)).

The terms "$(C_1-C_{40})$alkyl" and "$(C_1-C_{18})$alkyl" mean a saturated straight or branched hydrocarbon radical of from 1 to 40 carbon atoms and a saturated straight or branched hydrocarbon radical of from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and [C$_{45}$]alkyl. The term "[C$_{45}$]alkyl" (with square brackets) means there is a maximum of 45 carbon atoms in the radical, including substituents, and is, for example, a $(C_{27}-C_{40})$alkyl substituted by one $R^S$ which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis([C$_{20}$]alkyl)-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyi, substituted $(C_3-C_{10})$cycloalkyl, cyclopentanon-2-yl, and -fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$—). Some examples of $(C_6-C_{50})$arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$)—, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis(methylene)bicyclo [2.2.2] octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$, Si(R$^P$)$_2$, P(R$^P$), N(R$^N$), —N=C(R$^C$)$_2$, —Ge(R$^C$)$_2$—, or —Si(R$^C$)—, where each R$^C$ and each R$^P$ is unsubstituted $(C_1-C_{18})$hydrocarbyl or —H, and where each R$^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{40})$heterohydrocarbyl" means a heterohydrocarbon radical of from 1 to 40 carbon atoms, and the term "$(C_1-C_{40})$heterohydrocarbylene" means a heterohydrocarbon diradical of from 1 to 40 carbon atoms. The heterohydrocarbon of the $(C_1-C_{40})$heterohydrocarbyl or the $(C_1-C_{40})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the of there radical on a different heteroatom. Each $(C_1-C_{40})$heterohydrocarbyl and $(C_1-C_{40})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{40})$heterohydrocarbyl may be unsubstituted or substituted. Non-limiting examples of the $(C_1-C_{40})$heterohydrocarbyl may include: $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si$(R^C)_2$—, $(C_1-C_{40})$hydrocarbyl-N$(R^N)$—, $(C_1-C_{40})$hydrocarbyl-P$(R^P)$—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_1)$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^S$) mono-, bi-, or tricyclic heteroaromatic hydrocarbon radical of from 4 to 40 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, or 3; and each heteroatom may be O, S. N, or P.

Examples of 5-membered ring heteroaromatic hydrocarbon radicals include pyrrol-1-yl; pyrrol-2-yl; furan-3-yl: thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl: tetrazol-2-yl; and tetrazol-5-yl. The 6-membered ring monocyclic heteroaromatic hydrocarbon radical has 6 minus h carbon atoms, where h is the number of heteroatoms and may be 1 or 2 and the heteroatoms may be N or P.

Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6.5.6-ring system is 9H-carbazol-9-yl. An example of the fused 6,6,6-ring system is acrydin-9-yl.

The term "$C_1-C_{40}$heteroalkyl" means a saturated straight or branched chain radical one to forty carbon atoms and one or more heteroatom. The term "$(C_1-C_{40})$heteroalkylene" means a saturated straight or branched chain diradical containing from 1 to 40 carbon atoms and one or more than one heteroatoms. The heteroatoms, of the heteroalkyls or the hereroalkylenes, may include Si$(R^C)_3$, Ge$(R^C)_3$. Si$(R^C)_2$, Ge$(R^C)_2$, P$(R^P)_2$, P$(R^P)$, N$(R^N)_2$. N$(R^N)$, N. O, OR$^C$, S, SR$^C$, S(O), and S(O)$_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F$^-$), chloride (Cl$^-$), bromide (Br$^-$), or iodide (I$^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Embodiments of this disclosure include catalyst systems that include a metal-ligand complex according to formula (I):

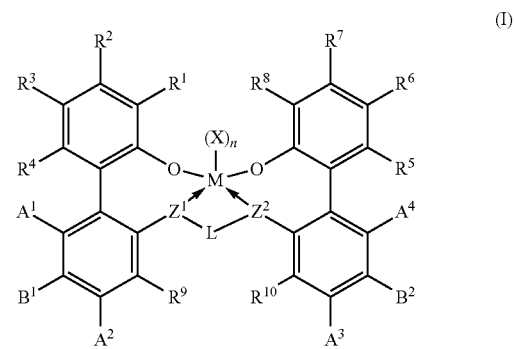

In formula (I), M is a metal chosen from titanium, zirconium, or hafnium, the metal having a formal oxidation state of +2, +3, or +4; n is 0, 1, or 2; when n is 1, X is a monodentate ligand or a bidentate ligand; when n is 2, each X is an independently chosen monodentate ligand; the metal-ligand complex is overall charge-neutral; each $Z^1$ and $Z^2$ is independently chosen from —O—, —S—, —N$(R^N)$—, or —P$(R^P)$—; $R^1$ and $R^8$ are independently selected from the group consisting of —H, $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, $R^C$S(O)—, $R^C$S(O)$_2$—, $(R^C)_2$C=N—, $R^C$C(O)O—, $R^COC(O)$—, $R^CC(O)N(R)$—, $(R^C)_2NC(O)$—, halogen, radicals having formula (II), radicals having formula (III), and radicals having formula (IV):

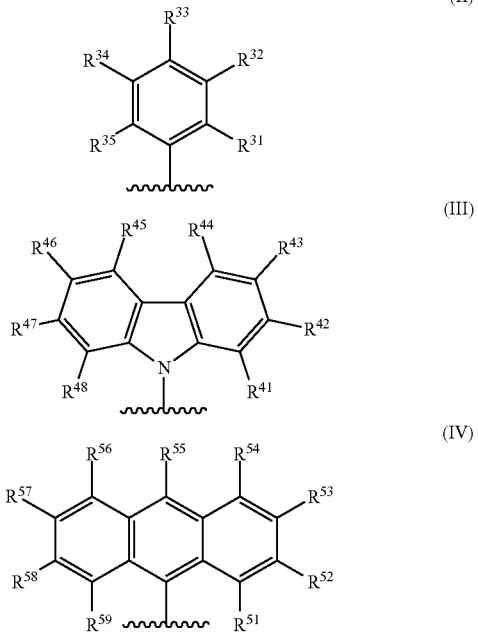

(II)

(III)

(IV)

In formulas (II), (III), and (IV), each of $R^{31-35}$, $R^{41-48}$, and $R^{51-59}$ is independently chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —N=CHR$^C$, —OR$^C$, —SR$^C$, —NO$_2$, —CN, —CF$_3$, $R^CS(O)$—, $R^CS(O)_2$—, $(R^C)_2C=N$—, $R^CC(O)O$—, $R^COC(O)$—, $R^CC(O)N(R^N)$—, $(R^C)_2NC(O)$—, halogen, or —H, provided at least one of $R^1$ or $R^8$ is a radical having formula (II), a radical having formula (III), or a radical having formula (IV).

In formula (I), each of $R^{2-4}$, $R^{5-7}$, and $R^{9-10}$ is independently selected from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —N=CHR$^C$, —OR$^C$, —SR$^C$, —NO$_2$, —CN, —CF$_3$, $R^CS(O)$—, $R^CS(O)_2$—, $(R^C)_2C=N$—, $R^CC(O)O$—, $R^COC(O)$—, $R^CC(O)N(R^N)$—, $(R^C)_2NC(O)$—, halogen, and —H.

In one or more embodiments, $R^3$ and $R^6$ are —Si$(R^C)_3$, where each $R^C$ is independently selected from methyl, butyl, n-octyl, or tert-octyl. In some embodiments, $R^3$ and $R^6$ are independently n-octyl or tert-octyl (also called 1,1,3,3-tetramethylbutyl).

In formula (I), each of $A^{1-4}$ is independently selected from halogen or —H, provided at least one of $A^1$ or $A^2$ is halogen and at least one of $A^3$ or $A^4$ is halogen. In some embodiments, each of $A^{1-4}$ is independently halogen.

In formula (I), each of $B^{1-2}$ is an independently chosen electron donating group or electron releasing group. The terms "electron donating group" and "electron releasing group" are interchangeable. The electron donating group is an atom or functional group that donates some of its electron density in to a conjugated π-system via resonance or inductive effects, thus making the π-system more nucleophilic. Examples of electron donating groups include $(C_1-C_{40})$alkyl, —N$(R^N)_2$, —Si$(R^C)_3$, or —OR$^C$. Each of $B^{1-2}$ is independently selected from $(C_1-C_{40})$alkyl, —N$(R^N)_2$, —Si$(R^C)_3$, or —OR$^C$. In one or more embodiments, each of $B^{1-2}$ is tert-butyl.

In formula (I), L is $(C_2-C_{40})$hydrocarbylene or $(C_2-C_{40})$heterohydrocarbylene. In one or more embodiments, the diradical of L that links $Z^1$ to $Z^2$ includes from 2 to 10 atoms.

In some embodiments of formula (I), the L includes $(C_3-C_7)$alkyl 1,3-diradical, such as —CH$_2$CH$_2$CH$_2$—, —CH(CH$_3$)CH$_2$C*H(CH$_3$), —CH(CH$_3$)CH(CH$_3$)C*H(CH$_3$), —CH$_2$C(CH$_3$)$_2$CH$_2$—, cyclopentan-1,3-diyl, or cyclohexan-1,3-diyl. In some embodiments, the L includes $(C_4-C_{10})$alkyl 1,4-diradical, such as —CH$_2$CH$_2$CH$_2$CH$_2$—, —CH$_2$C(CH$_3$)$_2$C(CH$_3$)$_2$CH$_2$—, cyclohexane-1,2-diyldimethyl, and bicyclo[2.2.2]octane-2,3-diyldimethyl. In some embodiments, L includes $(C_5-C_{12})$alkyl 1,5-diradical, such as —CH$_2$CH$_2$CH$_2$CH$_2$CH$_2$—, 1,3-bis(methylene)cyclohexane. In some embodiments, L includes $(C_6-C_{14})$alkyl 1,6-diradical, and L is chosen from —CH$_2$CH$_2$CH$_2$CH$_2$CH$_2$CH$_2$— or 1,2-bis(ethylene)cyclohexane.

In one or more embodiments, L is $(C_2-C_{40})$heterohydrocarbylene, and at least one of the from 2 to 10 atoms in the portion of L includes a heteroatom. In some embodiments, L is —CH$_2$Ge$(R^{17})(R^{18})$CH$_2$—, where $R^{17}$ and $R^{18}$ are independently $(C_2-C_{30})$hydrocarbyl. In some embodiments, $R^{17}$ and $R^{18}$ are independently $(C_3-C_{30})$hydrocarbyl, such as 2-propyl, cyclopentyl, or cyclohexyl.

In one or more embodiments, in the metal-ligand complex of formula (I), either one of $R^1$ or $R^8$, or both $R^1$ and $R^8$, are chosen from radicals having formula (II), radicals having formula (III), or radicals having formula (IV):

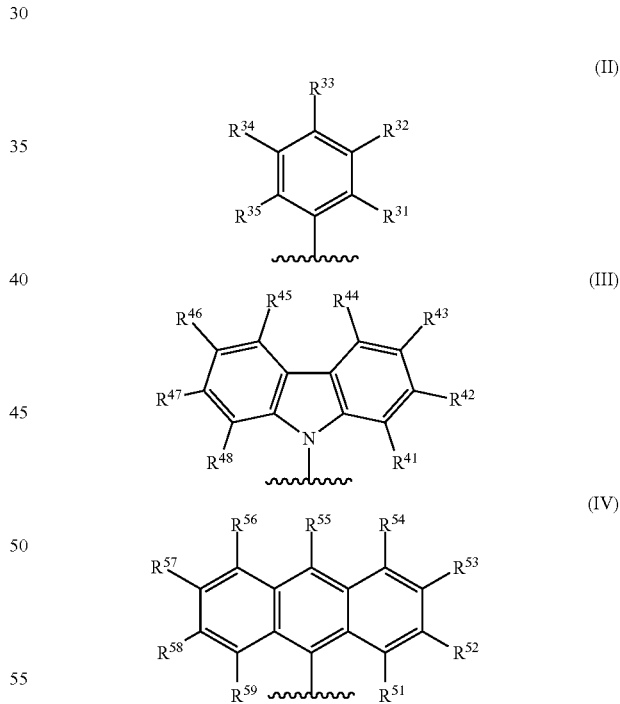

(II)

(III)

(IV)

When present the metal-ligand complex of formula (I) as part of a radical having formula (II), formula (III), or formula (IV), the groups $R^{31-35}$, $R^{41-48}$, and $R^{51-59}$ of the metal-ligand complex of formula (I) are each independently chosen from $(C_1-C_{40})$hydrocarbyl, $(C_1-C_{40})$heterohydrocarbyl, Si$(R^C)_3$, P$(R^P)_2$, N$(R^N)_2$, OR$^C$, SR$^C$, NO$_2$, CN, CF$_3$, $R^CS(O)$—, $R^CS(O)_2$—, $(R^C)_2C=N$—, $R^CC(O)O$—, $R^COC(O)$—, $R^CC(O)N(R^N)$—, $(R^N)_2NC(O)$—, halogen, hydrogen (—H), or combinations thereof. Independently each $R^C$, $R^P$, and $R^N$ are unsubstituted $(C_1-C_{18})$hydrocarbyl or —H.

In some embodiments, any or all of the chemical groups (e.g., X, $R^{1-59}$, L. and $B^{1-2}$) of the metal-ligand complex of formula (I) may be unsubstituted. In other embodiments, none, any, or all of the chemical groups X, $R^{1-59}$, L. and $B^{1-2}$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X. $R^{1-59}$. L. and $B^{1-2}$ may be persubstituted with $R^S$. In the chemical groups that are persubstituted with $R^S$, the individual $R^S$ may all be the same or may be independently chosen.

The groups $R^1$ and $R^8$ in the metal-ligand complex of formula (I) are chosen independently of one another. For example, $R^1$ may be chosen from a radical having formula (II), (III), or (IV), and $R^8$ may be a $(C_1-C_{40})$hydrocarbyl; or $R^1$ may be chosen from a radical having formula (II), (III), or (IV) and $R^8$ may be chosen from a radical having formula (II), (III), or (IV) the same as or different from that of $R^1$. Both $R^1$ and $R^8$ may be radicals of formula (II), for which the groups $R^{31-35}$ are the same or different in $R^1$ and $R^8$. In other examples, both $R^1$ and $R^8$ may be radicals of formula (III), for which the groups $R^{41}48$ are the same or different in $R^1$ and $R^8$; or both $R^1$ and $R^8$ may be radicals of formula (IV), for which the groups $R^{51-59}$ are the same or different in $R^1$ and $R^8$.

In one or more embodiments, one of or both of $R^1$ and $R^8$ is a radical having formula (II), where $R^{32}$ and $R^{34}$ are independently tert-butyl or 3,5-di-(tert-butyl)phenyl.

In some embodiments, when one of $R^1$ or $R^8$ is a radical having formula (III), one of or both of $R^{42}$ and $R^{47}$ is tert-butyl and each of $R^{41}$, $R^{43-46}$, and $R^{48}$ are —H. In other embodiments, one of or both of $R^{43}$ and $R^{46}$ is tert-butyl and $R^{41-42}$, $R^{44-45}$, and $R^{47-48}$ are —H. In one or more embodiments, when one of $R^1$ or $R^8$ is a radical having formula (III), both $R^{42}$ and $R^{47}$ are —H.

The M in the metal-ligand complex of formula (I) may be a transition metal such as titanium (Ti), zirconium (Zr), or hafnium (Hf), and the transition metal may have a formal oxidation state of +2, +3, or +4. The subscript n of $(X)_n$, referring to a number of ligands X bonded to or associated with the metal M, is an integer of from 1, 2, or 3.

The metal M in the metal-ligand complex of formula (I) may be derived from a metal precursor that is subsequently subjected to a single-step or multi-step synthesis to prepare the metal-ligand complex. Suitable metal precursors may be monomeric (one metal center), dimeric (two metal centers), or may have a plurality of metal centers greater than two, such as 3, 4, 5, or more than 5 metal centers. Specific examples of suitable hafnium and zirconium precursors, for example, include, but are not limited to $HfCl_4$, $HfMe_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_{32})_2Cl_2$; $ZrCl_4$, $ZrMe_4$, $Zr(CH_2Ph)_4$, $Zr(CH_2CMe_3)_4$, $Zr(CH_2SiMe_3)_4$, $Zr(CH_2Ph)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, $Zr(NMe_2)_2Cl_2$, $Zr(NEt_2)_2Cl_2$, $Zr(N(SiMe_3)_2)_2Cl_2$, $TiBn_4$, $TiCl_4$ and $Ti(CH_2Ph)_4$. Lewis base adducts of these examples are also suitable as metal precursors, for example, ethers, amines, thioethers, and phosphines are suitable as Lewis bases. Specific examples include $HfCl_4(THF)_2$, $HfCl_4(SMe_2)_2$ and $Hf(CH_2Ph)_2Cl_2(OEt_2)$. Activated metal precursors may be ionic or zwitterionic compounds, such as $(M(CH_2Ph)_3^+)(B(C_6F_5)_4^-)$ or $(M(CH_2Ph)_3^+)$ $(PhCH_2B(C_6F_5)_3^-)$ where M is defined above as being Hf or Zr.

In the metal-ligand complex according to formula (I), each X bonds with M through a covalent bond, a dative bond, or an ionic bond. When n is 1, X may be a monodentate ligand or a bidentate ligand; when n is 2, each X is an independently chosen monodentate ligand and may be the same as or different from other groups X. In general, the metal-ligand complex according to formula (I) is overall charge-neutral. In some embodiments, the monodentate ligand may be a monoanionic ligand. Monoanionic ligands have a net formal oxidation state of −1. Each monoanionic ligand may independently be hydride. $(C_1-C_{40})$hydrocarbyl carbanion, $(C_1-C_{40})$heterohydrocarbyl carbanion, halide, nitrate, carbonate, phosphate, sulfate. $HC(O)O^-$, $HC(O)N(H)^-$, $(C_1-C_{40})$hydrocarbyl$C(O)O—$, $(C_1-C_{40})$hydrocarbyl$C(O)N((C_1-C_{20})$hydrocarbyl$)^-$, $(C_1-C_{40})$hydrocarbyl$C(O)N(H)^-$. $R^KR^LB^-$, $R^KR^LN^-$. $R^KO^-$, $R^KS^-$, $R^KR^LP^-$, or $R^MR^KR^LSi^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In other embodiments, at least one monodentate ligand X, independently from any other ligands X, may be a neutral ligand. In specific embodiments, the neutral ligand is a neutral Lewis base group such as $R^XNR^KR^L$. $R^KOR^L$, $R^KSR^L$, or $R^XPR^KR^L$, where each $R^X$ independently is hydrogen, $[(C_1-C_{10})$hydrocarbyl$]_3Si(C_1-C_{10})$hydrocarbyl, $(C_1-C_{40})$hydrocarbyl, $[(C_1-C_{10})$hydrocarbyl$]_3Si$. or $(C_1-C_{40})$heterohydrocarbyl and each $R^K$ and $R^L$ independently is as previously defined.

Additionally, each X can be a monodentate ligand that, independently from any other ligands X, is a halogen, unsubstituted $(C_1-C_{20})$hydrocarbyl, unsubstituted $(C_1-C_{20})$hydrocarbyl$C(O)O—$, or $R^KR^LN—$, wherein each of $R^K$ and $R^L$ independently is an unsubstituted$(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbyl$C(O)O—$, or $R^KR^LN—$, wherein each of $R^K$ and $R^L$ independently is an unsubstituted $(C_1-C_{10})$hydrocarbyl.

In further embodiments in which n is 2 or 3, such that there are at least two groups X, any two groups X may be joined to form a bidentate ligand. In illustrative embodiments including a bidentate ligand, the bidentate ligand may be a neutral bidentate ligand. In one embodiment, the neutral bidentate ligand is a diene of formula $(R^D)_2C=C(R^D)—C(R^D)=C(R^D)_2$, wherein each $R^D$ independently is H, unsubstituted $(C_1-C_6)$alkyl, phenyl, or naphthyl. In some embodiments the bidentate ligand is a monoanionic-mono (Lewis base) ligand. In some embodiments, the bidentate ligand is a dianionic ligand. The dianionic ligand has a net formal oxidation state of −2. In one embodiment, each dianionic ligand independently is carbonate, oxalate (i.e., $^-O_2CC(O)O^-$). $(C_2-C_{40})$hydrocarbylene dicarbanion, $(C_1-C_{40})$heterohydrocarbylene dicarbanion, phosphate, or sulfate.

In further embodiments, X is selected from methyl; ethyl; 1-propyl; 2-propyl; 1-butyl; 2.2-dimethylpropyl; trimethylsilylmethyl; phenyl; benzyl; or chloro. In some embodiments n is 2 and each X is the same. In some instances, at least two X are different from each other. In other embodiments n is 2 and each X is a different one of methyl; ethyl; 1-propyl; 2-propyl; 1-butyl; 2.2-dimethylpropyl: trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In the metal-ligand complex of formula (I), each $Z^{1-2}$ is independently O, S, $N(C_1-C_{40})$hydrocarbyl, or $P(C_1-C_{40})$hydrocarbyl. In some embodiments, each Z is different. For example, one Z is O and the other Z is $NCH_3$. In some embodiments, one Z is O and one Z is S. In another embodiment, one Z is S and one Z is $N(C_1-C_{40})$hydrocarbyl, (for example, $NCH_3$). In a further embodiment, each Z is the same. In yet another embodiment, each Z is O. In another embodiment, each Z is S.

In specific embodiments of catalyst systems, the metal-ligand complex according to formula (I) may include, without limitation, a complex having the structure of any of Procatalysts 1-7:

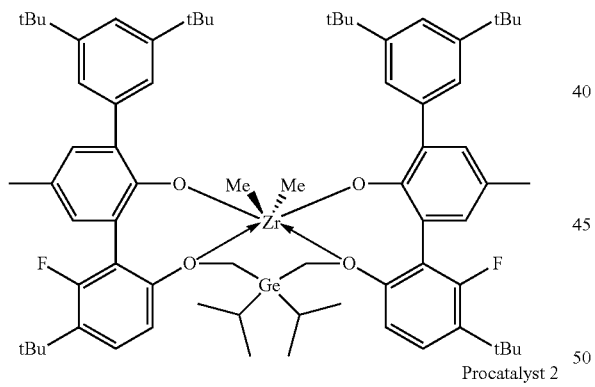

Procatalyst 1

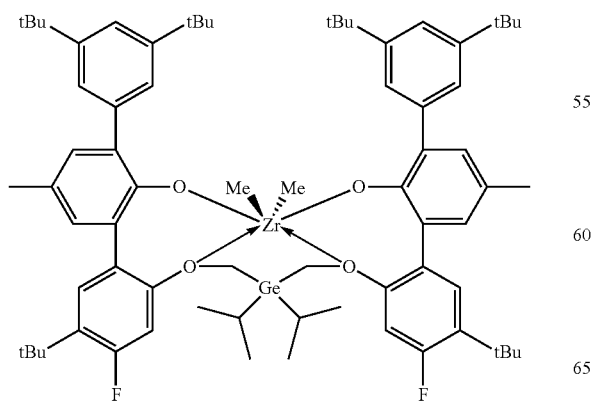

Procatalyst 2

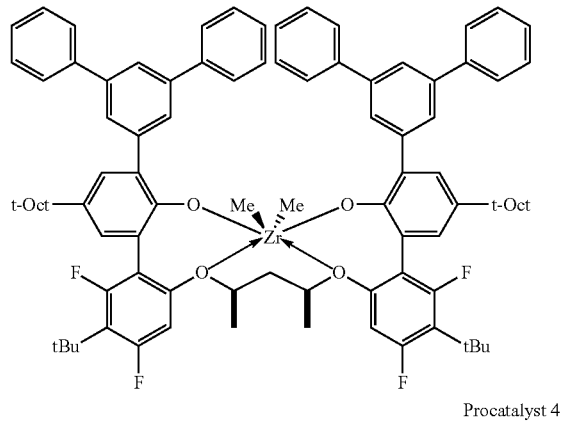

Procatalyst 3

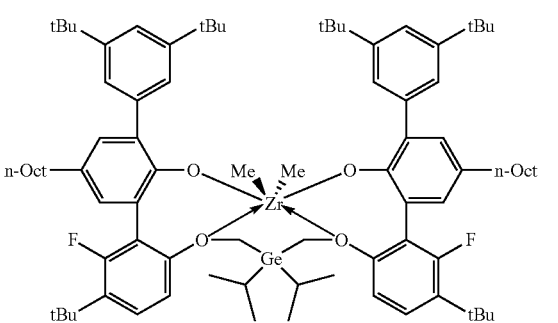

Procatalyst 4

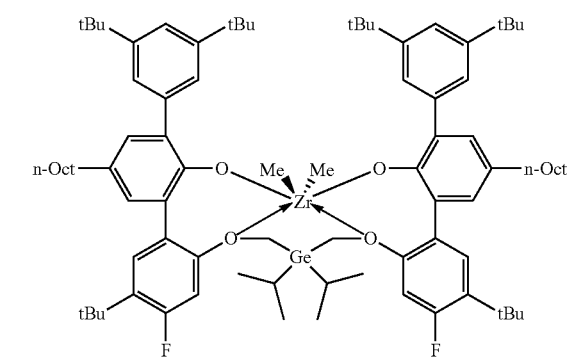

Procatalyst 5

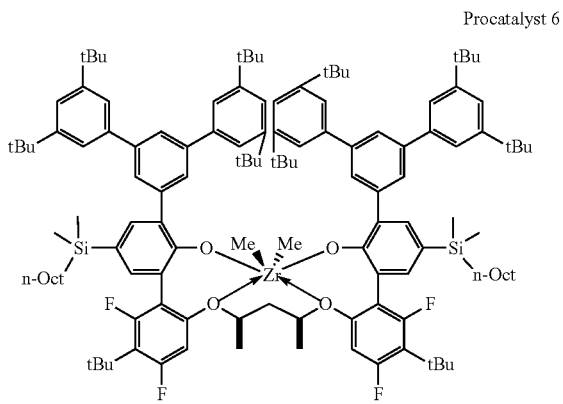

Procatalyst 6

Procatalyst 7

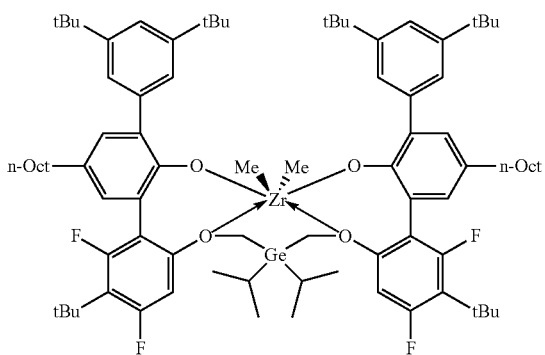

Procatalyst Activation

The catalyst systems of this disclosure include a metal-ligand complex according to formula (I). The metal-ligand complex according to formula (I) may be in a catalytically active form or in a procatalyst form that is catalytically inactive or is at least substantially less catalytically active than the catalytically active form. The procatalysts 1-7 are catalytically inactive forms of various metal-ligand complexes according to formula (I). The procatalyst system comprising the metal-ligand complex of formula (I) in a procatalyst form may be rendered catalytically active by any technique known in the art for activating metal-based catalysts of olefin polymerization reactions. For example, a metal-ligand complex of formula (I) may be rendered catalytically active by contacting the metal-ligand complex to, or combining the metal-ligand complex with, an activating co-catalyst. Another example of a suitable activating technique includes bulk electrolysis. Combinations of one or more of the foregoing activating co-catalysts and techniques are also contemplated. Subjecting a metal-ligand complex according to formula (I) in a procatalyst form to any of such activating techniques results in a catalytically activated form of the metal-ligand complex according to formula (I). In some embodiments, the catalytically activated form of the metal-ligand complex according to formula (I) may be the result of cleaving at least one X from the procatalyst form of the metal-ligand complex according to formula (I) by any of the foregoing activation techniques.

Co-Catalyst Component

The catalyst system comprising a metal-ligand complex of formula (I) may be rendered catalytically active by any technique known in the art for activating metal-based catalysts of olefin polymerization reactions. For example, the comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 $(C_1-C_{20})$hydrocarbyl substituents as described herein. In one embodiment, Group 13 metal compounds are tri$((C_1-C_{20})$hydrocarbyl)-substituted-aluminum, tri$((C_1-C_{20})$hydrocarbyl)-boron compounds, tri$((C_1-C_{10})$alkyl)aluminum, tri$((C_6-C_{18})$aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tetrakis$((C_1-C_{20})$hydrocarbyl borate or a tri$((C_1-C_{20})$hydrocarbyl)ammonium tetrakis$((C_1-C_{20})$hydrocarbyl)borate (e.g. bis(octadecyl)methylammonium tetrakis(pentafluorophenyl)borate). As used herein, the term "ammonium" means a nitrogen cation that is a $((C_1-C_{20})$hydrocarbyl$)_4$N$^+$ a $((C_1-C_{20})$hydrocarbyl$)_3$N(H)$^+$, a $((C_1-C_{20})$hydrocarbyl$)_2$N(H)$_2^+$, $(C_1-C_{20})$hydrocarbylN(H)$_3^+$, or N(H)$_4^+$, wherein each $(C_1-C_{20})$hydrocarbyl, when two or more are present, may be the same or different.

Combinations of neutral Lewis acid activators (co-catalysts) include mixtures comprising a combination of a tri$((C_1-C_4)$alkyl)aluminum and a halogenated tri$((C_6-C_{18})$aryl)boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:100, in other embodiments, from 1:1:1.5 to 1:5:30.

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(1$^-$) amine, and combinations thereof.

In some embodiments, one or more of the foregoing activating co-catalysts are used in combination with each other. An especially preferred combination is a mixture of a tri$((C_1-C_4)$hydrocarbyl)aluminum, tri$((C_1-C_4)$hydrocarbyl) borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene, ethylidene norbornene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent monomer units derived from ethylene. All individual values and subranges from at least 90 mole percent monomer units derived from ethylene are included herein and disclosed herein as separate embodiments. For example, the ethylene based polymers may comprise at least 93 mole percent monomer units derived from ethylene; at least 96 mole percent monomer units; at least 97 mole percent monomer units derived from ethylene; or in the alternative, from 90 to 100 mole percent monomer units derived from ethylene; from 90 to 99.5 mole percent monomer units derived from ethylene; or from 97 to 99.5 mole percent monomer units derived from ethylene.

In some embodiments of the ethylene based polymer, the amount of additional α-olefin is less than 50%; other embodiments include at least 1 mole percent (mol %) to 20 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors. In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more co-catalysts, as described in the preceding paragraphs.

In some embodiments, the polymerization process for producing an ethylene-based polymer includes polymerizing ethylene and at least one additional α-olefin in the presence of a catalyst system. In one or more embodiments, the catalyst system may include the metal-ligand complex according to formula (I) in its catalytically active form without a co-catalyst or an additional catalyst. In further embodiments, the catalyst system may include the metal-ligand complex according to formula (I) in its procatalyst form, its catalytically active form, or a combination of both forms, in combination with at least one co-catalyst. In further embodiments, the catalyst system may include the metal-ligand complex according to formula (I) in its procatalyst form in combination with at least one co-catalyst and at least one additional catalyst. In further embodiments, the catalyst system may include a first catalyst and at least one additional catalyst, and, optionally, at least one co-catalyst, where the first catalyst is a metal-ligand complex according to formula (I) in its catalytically active form.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm³ to 0.950 g/cm³, from 0.880 g/cm³ to 0.920 g/cm³, from 0.880 g/cm³ to 0.910 g/cm³, or from 0.880 g/cm³ to 0.900 g/cm³, for example.

In another embodiment, the polymer resulting from the catalyst system that includes the metal-ligand complex of formula (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1 to 10, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

One or more features of the present disclosure are illustrated in view of the examples as follows:

EXAMPLES

Example 1: Preparation of 2-bromo-4-(t-butyl)-3-fluorophenol

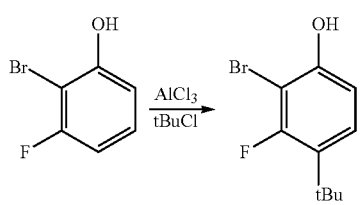

In a glovebox, a 40 mL vial was charged with 2-bromo-3-fluorophenol (7.64 g, 40 mmol, 1.0 equiv) and 2-chloro-2-methyl propane (8.7 mL, 80 mmol, 2.0 equiv). AlCl₃ (213 mg, 1.6 mmol, 0.04 equiv) was added slowly to maintain the reaction temperature below 40° C. The reaction mixture was stirred at room temperature for one hour. Additional AlCl₃ (160 mg, 1.2 mmol, 0.03 equiv) was then added. After the reaction mixture was stirred 12 hours (h) at room temperature, the reaction mixture was purified by silica gel (SiO₂) column chromatography. A yield of 6.36 g of a light brown oil was collected (64% theoretical yield).

¹H NMR (400 MHz, CDCl₃) δ 7.15 (t, J=8.9 Hz, 1H), 6.75 (dd, J=8.7, 1.7 Hz, 1H), 5.44 (s, 1H), 1.35 (d, J=1.2 Hz, 9H). ¹⁹F{1H} NMR (376 MHz, CDCl₃) 5-101.41 (s, 1F).

Example 2: Preparation of 2-bromo-4-(t-butyl)-5-fluorophenol

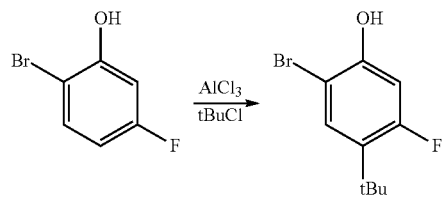

In a glovebox, a 40 mL vial was charged with 2-bromo-5-fluorophenol (7.64 g, 40 mmol, 1.0 equiv) and 2-chloro-2-methyl propane (8.7 mL, 80 mmol, 2.0 equiv). AlCl₃ (213 mg, 1.6 mmol, 0.04 equiv) was added aliquot by aliquot to maintain the reaction temperature below 40° C. The reaction mixture was stirred at room temperature for one hour. Additional AlCl₃ (160 mg, 1.2 mmol, 0.03 equiv) was then added. After stirring 12 h at room temperature, the reaction mixture was purified by SiO₂ column chromatography. A yield of 8.45 g of a light brown oil was collected (85% theoretical yield).

¹H NMR (400 MHz, CDCl₃) δ 7.33 (d, J=8.3 Hz, 1H), 6.72 (d, J=13.0 Hz, 1H), 5.40 (d, J=1.5 Hz, 1H), 1.33 (d, J=1.1 Hz, 9H). ¹⁹F{1H} NMR (376 MHz, CDCl₃) 5-108.01 (s, 1F).

Example 3: Preparation of 2-bromo-4-(t-butyl)-3,5-difluorophenol

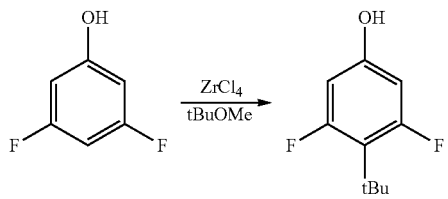

In a glovebox, to a 2-methoxy-2-methylpropane (13.1 mL, 110 mmol, 2.2 equiv) solution of 3,5-difluorophenol (6.505 g, 50 mmol, 1.0 equiv) in a 40 mL vial, ZrCl₄ (5.826 g, 25 mmol, 0.5 equiv) was added slowly to keep the reaction mixture at 30-40° C. The reaction was stirred at room temperature for 2 h then at 50° C. for 48 h. The reaction was quenched with saturated aqueous (sat. aq.) NH₄Cl and 2 molar (M) HCl then extracted with diethyl ether. The diethyl ether extract was washed with sat. aq. sodium chloride (brine), dried over MgSO₄ and the solvent was evaporated under reduced pressure. The resulting residue was purified by SiO₂ column chromatography. A yield of 5.29 g of a light brown oil was collected (57% theoretical yield).

¹H NMR (400 MHz, CDCl₃) δ 6.33-6.29 (m, 2H), 5.28 (s, 1H), 1.42 (t, J=2.2 Hz, 9H). ¹⁹F{1H} NMR (376 MHz, CDCl₃) δ−105.44 (s, 1F).

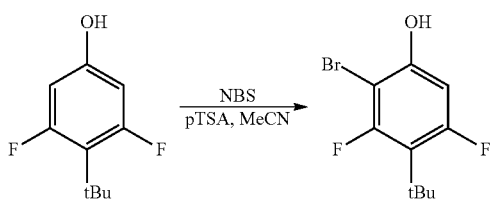

To a 40 mL vial equipped with a stir bar was added 4-(t-butyl)-3,5-difluorophenol (2.2 g, 11.8 mmol, 1.0 equiv), para-toluene sulfonic acid (pTSA) monohydrate (2.035 g, 11.8 mmol, 1.0 equiv), and acetonitrile (15 mL). The reaction mixture was cooled to 0-10° C. (ice-water bath) for about 15 minutes, and N-bromosuccinimide (NBS) (2.103 g, 11.8 mmol, 1.0 equiv) was added slowly. The reaction was allowed to stir overnight at room temperature. The following day the reaction mixture was concentrated and the residue was purified by $SiO_2$ column chromatography. A yield 2.04 g of a light brown oil was collected (65% theoretical yield).

$^1$H NMR (400 MHz, $CDCl_3$) δ 6.56 (dd, J=13.8, 2.3 Hz, 1H), 5.59 (s, 1H), 1.44 (t, J=2.3 Hz, 9H). $^{19}$F{$^1$H} NMR (376 MHz, $CDCl_3$) δ −98.45 (d, J=7.4 Hz, 1F),−105.74 (d, J=7.4 Hz, 1F).

Example 4: Preparation of 2-(3',5'-di-t-butyl-5-octyl-2-((tetrahydro-2H-pyran-2-yl)oxy)-[1,1'-biphenyl]-3-yl)-4,4,5,5-tetramethyl-1,3,2-dioxaborolane

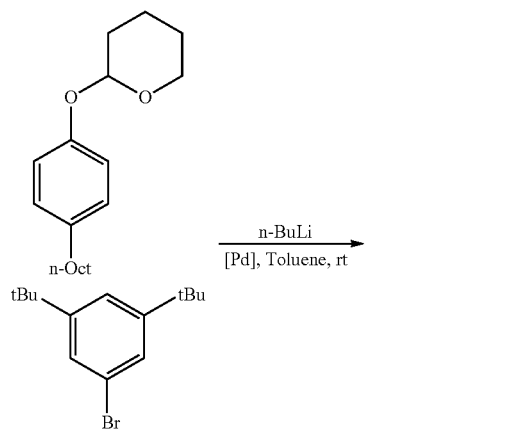

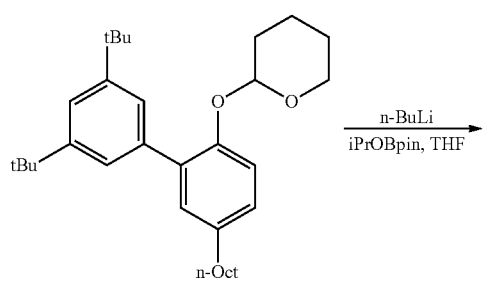

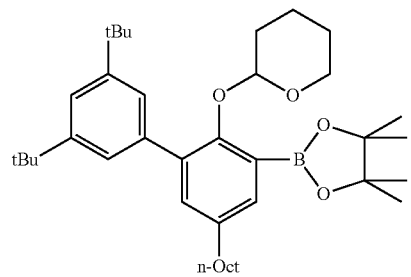

Preparation of ArLi solution:

In a glovebox, a dry 40 mL vial was charged with 2-(4-octylphenoxy)tetrahydro-2H-pyran (2.906 mL, 10.0 mmol, 1.0 equiv) and dry THF (10 mL) and the solution was cooled down to −30° C. in a freezer for 30 minutes. After removing from the freezer, n-BuLi (4.8 mL, 12.0 mmol, 1.2 equiv) was added slowly to the cooled solution. The reaction mixture was stirred at room temperature for 2 h.

Cross-Coupling Reaction:

In a glovebox, a 250 mL round bottom flask (round bottom flask) was charged with 1-bromo-3,5-di-t-butylbenzene (2.694 mL, 10.0 mmol, 1.0 equiv), $tBu_3P$ Pd G2 (Buchwald second generation pre-catalyst, 154 mg, 0.30 mmol, 0.03 equiv), and toluene (40 mL). The round bottom flask was capped, sealed, and taken out of glovebox and the ArLi solution prepared above was added slowly by a syringe pump at room temperature over 90 minutes. The reaction was quenched with methanol (MeOH). Solvents were evaporated and the product was purified by $SiO_2$ column chromatography. A yield of 3.67 g of a colorless solid was collected (77% theoretical yield).

Borylation:

In a glovebox, a dried 40 mL vial was charged with 2-((3',5'-di-t-butyl-5-octyl-[1,1'-biphenyl]-2-yl)oxy)tetrahydro-2H-pyran (3.67 mL, 7.67 mmol, 1.0 equiv) prepared above and THF (30 mL) then subsequently cooled to −30° C. in a freezer. After removing from the freezer, n-BuLi (4.3 mL, 10.7 mmol, 1.4 equiv) was added dropwise to the cooled solution, the reaction mixture was stirred at room temperature for 3 h, 2-Isopropoxy-4,4,5,5-tetramethyl-1,2,3-dioxaborolane (iPrOBpin) (2.35 mL, 11.5 mmol, 1.5 equiv) was then added in one portion, and the resulting mixture was stirred overnight. Water (3 mL) was added to the reaction and solvents were removed by rotary evaporation. The residue was dissolved in $CH_2Cl_2$ (150 mL) and washed several times with brine. After drying with $MgSO_4$ and filtration, the product was obtained by removal of solvent. The crude product was used without further purification. A yield of 4.27 g of a colorless solid was collected (92% theoretical yield).

$^1$H NMR (400 MHz, $CDCl_3$) δ 7.52 (d, J=2.4 Hz, 1H), 7.38 (d, J=1.9 Hz, 2H), 7.35 (t, J=1.8 Hz, 1H), 7.23 (d, J=2.4 Hz, 1H), 4.99 (t, J=3.1 Hz, 1H), 2.93-2.86 (m, 1H), 2.69-2.61 (m, 1H), 2.61-2.55 (m, 2H), 1.79-1.56 (m, 4H), 1.44-1.09 (m, 44H), 0.91-0.82 (m, 3H).

Example 5: Preparation of 1-(methoxymethoxy)-4-(2,4,4-trimethylpentan-2-yl)benzene

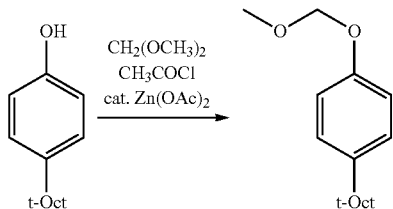

A 500-mL three-neck round bottom flask equipped with a thermocouple, a reflux condenser, and a nitrogen pad was charged with dimethoxymethane (24.73 g, 325 mmol), toluene (100 mL), and Zn(OAc)$_2$ (9.0 mg, 0.066 mmol). Acetyl chloride (25.51 g, 325 mmol) was added via syringe over 5 min with stirring. An exothermic reaction was observed: the temperature gradually rose to 37° C. over the next 10 min. At this point a cold water bath was applied to cool the reaction. When the temperature dropped to 30° C., the cold water bath was removed and the reaction mixture was allowed to stir at ambient temperature for an additional 4 h.

One portion of 4-tert-octylphenol (51.58 g, 250 mmol) was added, followed by addition of diisopropylethylamine (iPr$_2$NEt, 42.00 g, 325 mmol) over 5 min. The resulting reaction mixture was stirred at ambient temperature for 1 h (a slightly exothermic reaction was observed at the beginning with about a 2° C. temperature increase), then heated at 60° C. overnight (18 h). An aliquot of the reaction mixture was taken, treated with sat. aq. NH$_4$Cl solution, and extracted with EtOAc. The reaction mixture was allowed to cool to ambient temperature, and then further cooled in an ice-water bath. A saturated aqueous NH$_4$Cl solution (100 mL) was added at such a rate to maintain the temperature below 30° C. (an exothermic reaction was observed: temperature increased from 23 to 30° C. in 5 min). The biphasic reaction mixture was stirred for 1-2 h (to ensure excess MOM-Cl was completely decomposed), then diluted with hexane (100 mL). The two phases were separated. The organic layer was washed with water (150 mL×2), filtered through a plug of anhydrous Na$_2$SO$_4$, and concentrated to dryness under reduced pressure using rotary evaporation, which gave the desired product as a colorless oil (60.85 g, 97% yield). The crude product was used in Example 6 without further purification:

$^1$H NMR (400 MHz, CDCl$_3$) δ 7.27 (d, J=8.8 Hz, 2H), 6.94 (d, J=8.8 Hz, 2H), 5.15 (s, 2H), 3.48 (s, 3H), 1.7 (s, 2H), 1.34 (s, 6H), 0.72 (s, 9H). $^{13}$C NMR (75 MHz, CDCl$_3$) δ 154.90, 143.58, 127.06, 115.47, 94.65, 57.00, 55.94.38.04, 32.33, 31.78, 31.61.

Example 6: Preparation of 2-(2-(methoxymethoxy)-5-(2,4,4-trimethylpentan-2-yl)phenyl)-4,4,5,5-tetramethyl-1,3,2-dioxaborolane

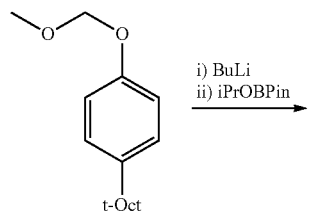

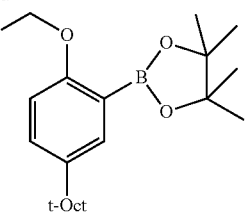

A 2 L four-neck round bottom flask equipped with an overhead stirrer, a condenser, a thermometer, and a nitrogen pad, was loaded with 1-(methoxymethoxy)-4-(2,4,4-trimethylpentan-2-yl)benzene (62.00 g, 248 mmol) and anhydrous THF (350 mL) under nitrogen atmosphere. The mixture was cooled to below −70° C. in a dry-ice acetone bath. A solution of 1.6 M n-BuLi in hexane (201 mL, 322 mmol, 1.3 equiv.) was added via syringe pump over 30 min at −65 to −74° C. After the resulting mixture was stirred below −65° C. for 1.5 h, the cooling bath was removed to allow the reaction mixture to warm up to ambient temperature for 1.5 h. The reaction mixture was cooled to below −70° C. again, and iPrOBPin (64.83 g, 348 mmol, 1.4 equiv.) was added via syringe pump at such a rate to maintain the temperature below −65° C. (20 min). The resulting mixture was stirred below −65° C. for an additional 1 h, then gradually warmed up to ambient temperature overnight (16 h). Afterwards, ice-water (500 g) was added and the mixture was stirred for 20-30 min. The reaction mixture was transferred into a 2-liter separatory funnel for phase separation. The bottom aqueous layer was drained into another separatory funnel and extracted with EtOAc (250 mL×2). The combined organic phases were washed with sat. aq. NH$_4$Cl (250 mL), water (250 mL), and brine (250 mL), filtered through a plug of anhydrous Na$_2$SO$_4$ (50 g). Evaporation of volatiles under reduced pressure using rotary evaporation gave a brown oil residue, which after further drying in a vacuum oven at 45° C. (1 mmHg) overnight gave the crude product as a brown oil (92.5 g, 93% yield). The crude product was a mixture of the product (85-90%) and the corresponding boronic acid (10-15%). The crude product was used in Example 8 without further purification:

$^1$H NMR (400 MHz, CDCl$_3$) δ 7.63 (d, J=2.6 Hz, 1H), 7.37 (dd, J1=8.7 Hz, J2=2.6 Hz, 1H), 6.93 (d, J=8.7 Hz, 1H), 5.15 (s, 2H), 3.51 (s, 3H), 1.71 (s, 2H), 1.35 (s, 6H), 1.34 (s, 12H), 0.72 (s, 9H).

Example 7: Preparation of 5'-chloro-, 1':3',1"-terphenyl

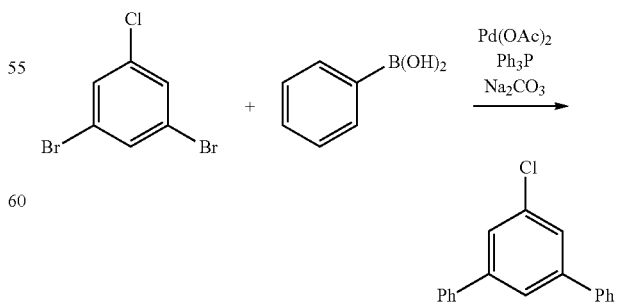

A 2-L 3-neck round bottom flask equipped with an overhead mechanical stirrer, a reflux condenser, a positive nitrogen pad, a thermocouple, and a heating mantle, was loaded with palladium acetate (Pd(OAc)$_2$) (2.245 g, 10.0 mmol), triphenylphosphine (PPh$_3$) (5.246 g, 20.0 mmol), and degassed toluene (625 mL) under nitrogen. The mixture was stirred at ambient temperature until all solids were dissolved (approximately 10 min to form an orange solution, and some orange solid precipitated out later). Then 1,3-dibromo-5-chlorobenzene (135.2 g, 500.0 mmol), phenylboronic acid (152.4 g, 1.25 mol, 2.5 equiv.), and degassed 2.0 M Na$_2$CO$_3$ (625 mL, 1.25 mol) were added to the round bottom flask. The mixture was stirred at ambient temperature. An exothermic reaction was observed, the reaction temperature gradually rose to 67° C. over the next 20 min, resulting in a dark brown mixture. The dark brown mixture was allowed to cool below 50° C. and was transferred into a separatory funnel for phase separation. Toluene (200 mL) and water (300 mL) were added. The bottom aqueous layer was drained out and discarded. The organic layer was washed with water (500 mL×2), and brine (200 mL). The washed organic phase was filtered through a bed of silica gel (80 g). The wet cake was washed with toluene (100 mL), and a mixture of hexane and ethyl acetate (200 mL, hexane/ethyl acetate=1:4 in volume).

The volatiles were removed under reduced pressure using rotary evaporation to give a solid residue (145 g), which was recrystallized from ethanol (EtOH) (250 mL) to give 122.50 g of the desired product. The filtrate was concentrated under reduced pressure and the residue was recrystallized from EtOH (50 mL) to give second portion of product (3.94 g). The total product was 126.44 g (95% theoretical yield):

$^1$H NMR (400 MHz, CDCl$_3$) δ 7.66 (t, J=1.6 Hz, 1H), 7.62 m, 2H), 7.60 (m, 2H), 7.55 (d, J=1.6 Hz, 2H), 7.48 (m, 1H), 7.46 (m, 2H), 7.44 (m, 1H), 7.30-7.42 (m, 2H).

Example 8: Preparation of 2-(methoxymethoxy)-5'-phenyl-5-(2,4,4-trimethylpentan-2-yl)-1,1':3',1''-terphenyl

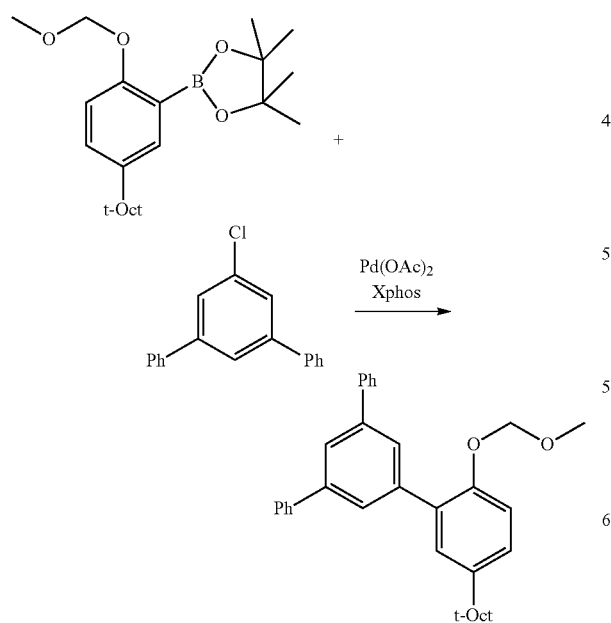

A 1 L 3-neck round bottom flask equipped with a mechanical stirrer, a reflux condenser (with N$_2$ inlet), a thermocouple, and a rubber septum was charged with 5'-chloro-1,1':3',1''-terphenyl (50.00 g, 189 mmol) and 2-(2-(methoxymethoxy)-5-(2,4,4-trimethylpentan-2-yl)phenyl)-4,4,5,5-tetramethyl-1,3,2-dioxaborolane (76.2 g, 198.3 mmol, 1.05 equiv.), tetrahydrofuran (THF, 290 mL), and a solution of 2 normal (N) NaOH (283 mL, 566 mmol, 3 equiv.). The resulting biphasic solution was mechanically stirred and purged with nitrogen for 30 min.

In a separate vial, Pd(OAc)$_2$, (212 mg, 0.5 mol %) and 2-dicyclohexylphosphino-2',4',6'-triisopropylbiphenyl (XPhos) (900 mg, 1 mol %) were combined and dissolved in 10 mL of degassed THF and stirred for ~10 min at ambient temperature. The resulting clear, deep purple catalyst solution was added into the reaction vessel via a hypodermic syringe. The reaction was stirred under N$_2$. The reaction was exothermic, heating to 45° C. without an external heat source.

When the exotherm subsided (the temperature began falling after reaching 45° C.). The reaction mixture was allowed to cool to ambient temperature and was diluted with EtOAc (20 mL). The contents were transferred into a separatory funnel. The bottom aqueous layer was separated and extracted with EtOAc (1×10 mL). The combined organic fraction was concentrated under reduced pressure using rotary evaporation to a thick black syrup then was dissolved in hexanes (50 mL) and flushed through a pad of silica gel eluting with 1:1 CH$_2$Cl$_2$-hexanes (800 mL). The filtrate was concentrated under reduced pressure using rotary evaporation to afford the desired product as a viscous brown residue, 82.5 g (91% theoretical yield):

$^1$H NMR (400 MHz, CDCl$_3$) δ 7.77 (m, 1H), 7.72-7.68 (m, 6H), 7.47 (t, J=7.4 Hz, 4H), 7.40-7.35 (m, 3H), 7.30 (dd, J1=2.4 Hz, J2=8.6 Hz, 1H), 7.15 (d, J=8.6 Hz, 1H), 5.10 (s, 2H), 3.40 (s, 3H), 1.74 (s, 2H), 1.41 (s, 6H), 0.76 (s, 9H).

Example 9: Preparation of 2-(2-(methoxymethoxy)-5'-phenyl-5-(2,4,4-trimethylpentan-2-yl)-[1,1',3',1''-terphenyl]-3-yl)-4,4,5,5-tetramethyl-1,3,2-dioxaborolane

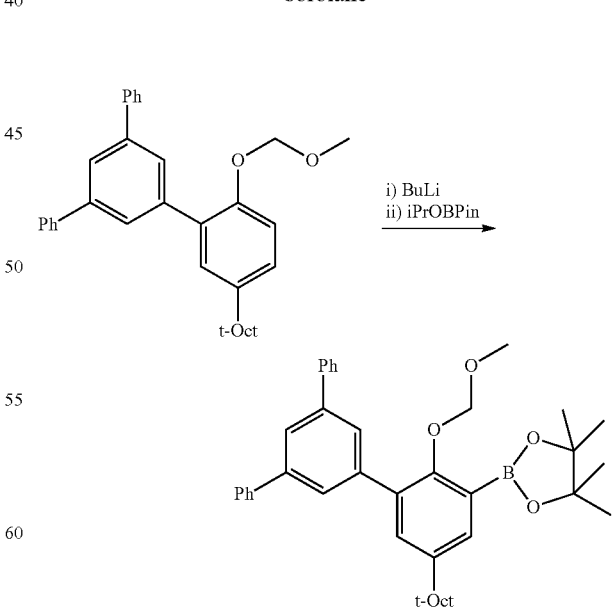

A 3 L three-neck round bottom flask equipped with a condenser, a mechanical stirrer, a thermometer, and a nitrogen pad, was loaded with 2-(methoxymethoxy)-5'-phenyl- 5-(2,4,4-trimethylpentan-2-yl)-1,1':3',1''-terphenyl (125.0 g, 261 mmol), and anhydrous tetrahydrofuran (THF, 750 mL). The mixture was cooled to −70° C. in a dry ice/acetone bath. A solution of 1.6 M n-BuLi in hexanes (220 mL, 353 mmol) was added via a syringe pump over 60 min (3.5 mULmin) at −70° C. to −60° C. The mixture was stirred below −70° C. for 1 h, and then warmed up to room temperature for 2 h with stirring. Afterwards, the resulting mixture was cooled to −70° C. again, and iPrOBPin (68.02 g, 366 mmol) was added at −70° C. over 60 min. The mixture was stirred at −70° C. for 2 h, then was allowed to warm up to ambient temperature and stirred overnight (16 h). After this time, the solution was cooled to 0° C., and water (250 mL) was slowly added, followed by addition of 1N HCl (approximately 345 mL) to adjust pH to 6-7. After addition of EtOAc (1 L) and stirring for 10 min. The biphasic mixture was separated. The water layer was extracted with EtOAc (250 mL×2). The combined organic layers were washed with brine (250 mL×2), and dried over anhydrous $Na_2SO_4$. The drying agents were filtered off and the organic layer was concentrated under reduced pressure. The residue was further dried at 40° C. (1-2 mmHg) overnight to afford 153.0 g (97% yield). This material was used in the next step without further purification. Further purification was achieved by recrystallization from EtOAc to afford a white crystalline product:

$^1$H NMR (400 MHz, $CDCl_3$) δ 7.78-7.74 (m, 3H), 7.72-7.67 (m, 4H), 7.52 (d, J=2.6 Hz, 1H), 7.47-7.42 (m, 4H), 7.38-7.33 (m, 2H), 4.86 (s, 2H), 2.89 (s, 3H), 1.76 (s, 2H), 1.42 (s, 6H), 1.37 (s, 12H), 0.77 (s, 9H).

Example 10: Preparation of 2-(4-bromophenoxy)tetrahydro-2H-pyran

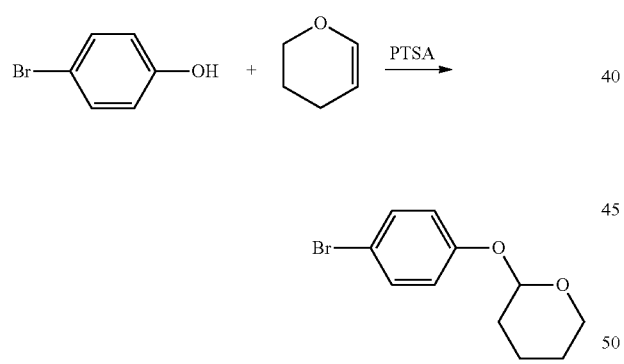

pTSA monohydrate (0.088 g, 0.462 mmol) was added to a 0° C. solution of 4-bromophenol (8.00 g, 46.2 mmol) in 3,4-dihydro-2H-pyran (11.7 mL, 138.7 mmol). The mixture was stirred at this temperature for 45 minutes (min). After this time, $Et_2O$ (50 mL) and 1 N NaOH (25 mL) were added to the reaction flask. The mixture was transferred to a separatory funnel and the layers were separated. The aqueous phase was further extracted with $Et_2O$ (50 mL). The organics were washed with brine (30 mL), dried ($Na_2SO_4$), filtered, then concentrated to dryness under reduced pressure to afford the desired compound (11.8 g, 94%) as a colorless oil, which crystallized upon standing.

$^1$H NMR (400 MHz, $CDCl_3$) δ 7.41-7.33 (m, 2H), 6.98-6.89 (m, 2H), 5.37 (t, J=3.3 Hz, 1H), 3.87 (ddd, J=11.4, 9.6, 3.2 Hz, 1H), 3.59 (dtd, J=11.4, 4.1, 1.4 Hz, 1H), 2.05-1.91 (m, 1H), 1.94-1.79 (m, 2H), 1.78-1.52 (m, 3H). $^{13}$C NMR (101 MHz, $CDCl_3$) δ 156.17, 132.19, 118.31, 113.83, 96.51, 62.00, 30.26, 25.13, 18.65.

Example 11: Preparation of dimethyl(octyl)(4-((tetrahydro-2H-pyran-2-yl)oxy)phenyl)silane

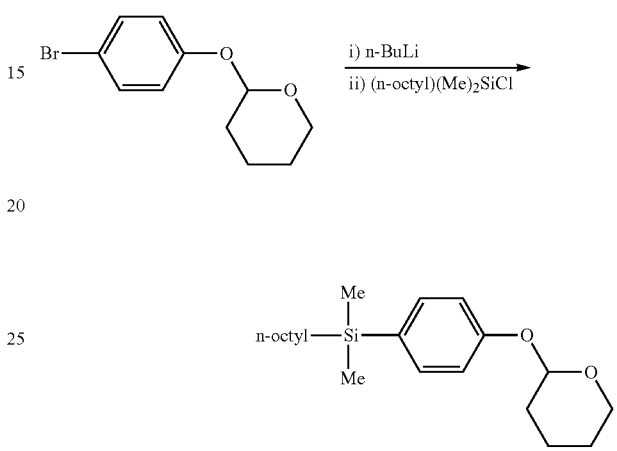

2.4M n-BuLi in hexanes (13.2 mL, 32 mmol) was added slowly to a 100 mL flask charged with 2-(4-bromophenoxy)tetrahydro-2H-pyran (7.75 g, 30 mmol) in THF (60 mL) at −78° C. The mixture was stirred at this temperature for 45 mins then neat n-octyl(dimethyl)chlorosilane (6.55 g, 7.50 mL, 32 mmol) was added slowly. The reaction was maintained at −78° C. for 30 mins then allowed to warm to room temperature while the cold bath expired (stirred 18 h). The reaction was quenched with the addition of sat. aq. $NH_4Cl$ (20 mL), the biphasic mixture was stirred vigorously for 30 minutes, then the phases were transferred to a separatory funnel. $Et_2O$ (20 mL) was added then the layers were separated. The aqueous phase was further extracted with $Et_2O$ (20 mL), and the combined organic extracts were washed with brine (15 mL), dried ($Na_2SO_4$), filtered and concentrated to dryness. The crude residue was purified directly using flash chromatography (20 g CELITE load cartridge, 80 g $SiO_2$, 60 mL/min, 0% EtOAc to 15% EtOAc in hexanes) to afford 8.5 g (81%) of the product as a colorless oil:

$^1$H NMR (400 MHz, $CDCl_3$) δ 7.48-7.39 (m, 2H), 7.10-7.01 (m, 2H), 5.46 (app t, J=3.3 Hz, 1H), 3.93 (ddd, J=11.6, 9.5, 3.1 Hz, 1H), 3.62 (app dtd, J=11.3, 4.0, 1.4 Hz, 1H), 2.1-1.48 (m, 6H), 1.35-1.19 (m, 12H), 0.93-0.84 (m, 3H), 0.76-0.67 (m, 2H), 0.23 (s, 6H). $^{13}$C NMR (101 MHz, $CDCl_3$) δ 157.88, 135.02, 131.80, 115.97, 96.23, 62.16, 33.79, 32.08, 30.53, 29.44, 29.42, 25.40, 24.05, 22.82, 18.95, 16.07, 14.26,−2.66. LCMS ES/APCIMS m/z 371 [(M+Na)$^+$].

The general synthesis of comparative catalyst and Procatalyst 1, 2, 3, 4, 5, 6, and 7 is in the FIGURE. Examples 12 to 30 are illustrative of the examples of the general synthetic scheme.

Representative Example: Synthesis of Comparative Catalyst C1

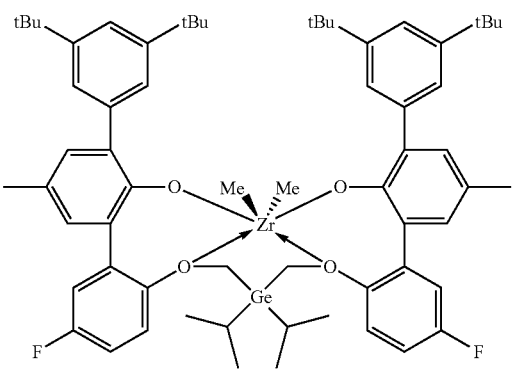

Example 12. Preparation of bis(chloromethyl)diisopropylgermane: Step 1a & 2

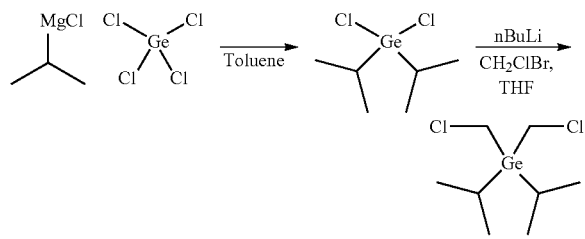

In a glovebox, a 100 mL round bottom flask was charged with GeCl$_4$ (8.578 g, 40 mmol, 1.0 equiv) and dried toluene (50 mL). The flask was capped with a septum, sealed, taken out of glovebox, and cooled to −78° C. using a dry ice-acetone bath. Isopropylmagnesium chloride solution in THF (2 M, 41 mL, 82.0 mmol, 2.05 equiv) was added dropwise to the pre-cooled solution. The reaction mixture solidified and was kept at −78° C. for 1 hour, then at room temperature for 3 h. The reaction mixture was brought into a glovebox and filtered on a fritted funnel. The filtrate was collected into a 250 mL round bottom flask. The solids were rinsed with hexane (50 mL). THF (100 mL) was added to the filtrate. The round bottom flask was capped, sealed, taken out of glovebox, and then cooled to −78° C. in a dry ice-acetone bath. Bromochloromethane (7.8 mL, 120.0 mmol, 3.0 equiv) was added. A solution of n-BuLi in hexane (2.5 M, 32.8 mL, 82.0 mmol, 2.05 equiv) was added to the cooled wall of the flask over a period of 3 h using a syringe pump. The mixture was allowed to warm up to room temperature overnight (16 h). Then saturated aqueous NH$_4$Cl (50 mL) was added. The two layers were separated. The aqueous layer was extracted with diethyl ether (2×60 mL). The combined organic layer was dried over MgSO$_4$, filtered through a plug of silica gel, and concentrated under reduced pressure. The crude product was used for the next step without further purification. A yield of 9.3 g of a colorless oil was collected (90% theoretical yield).

$^1$H NMR (400 MHz, CDCl$_3$) δ 3.17 (s, 4H), 1.66-1.54 (m, 2H), 1.20 (d, J=7.4 Hz, 12H).

Example 13: Preparation of bis((2-bromo-4-fluorophenoxy)methyl)diisopropylgermane: Step 3

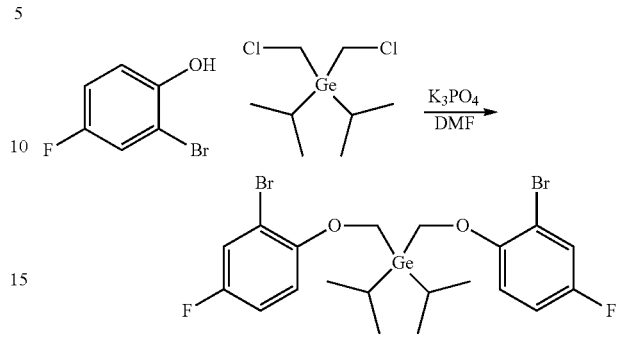

In a glovebox, a 40 mL vial was charged with bis (chloromethyl)diisopropylgermane (4.28 g, 16.6 mmol, 1.0 equiv), 2-bromo-4-fluorophenol (9.514 g, 50.0 mmol, 3.0 equiv), K$_3$PO$_4$ (14.1 g, 66.4 mmol, 4.0 equiv), and N,N-dimethylformamide (DMF) (20 mL). The reaction mixture was stirred at 80° C. overnight and then at 100° C. for 2 h. After cooling down to room temperature, the reaction mixture was poured into water (150 mL). The solution was extracted with ethyl acetate, washed twice with water, then twice with 1 M KOH, and then with brine. The organic layer was dried over MgSO$_4$, filtered through a short plug of silica gel, and concentrated. The crude product was used for next step without purification. A yield of 7.31 g of a colorless oil was collected (78% theoretical yield).

$^1$H NMR (400 MHz, CDCl$_3$) δ 7.29-7.24 (m, 2H), 7.02-6.96 (m, 4H), 4.13 (s, 4H), 1.75-1.62 (m, 2H), 1.27 (d, J=7.4 Hz, 12H). $^{19}$F{$^1$H} NMR (376 MHz, CDCl$_3$) δ −122.60 (s, 2F).

Example 14. Preparation of 6",6""'-(((diisopropylgermanediyl)bis(methylene))bis(oxy))bis(3,5-di-tert-butyl-3"-fluoro-5'-methyl-[1, 1'3',1"-terphenyl]-2'-ol): Step 4

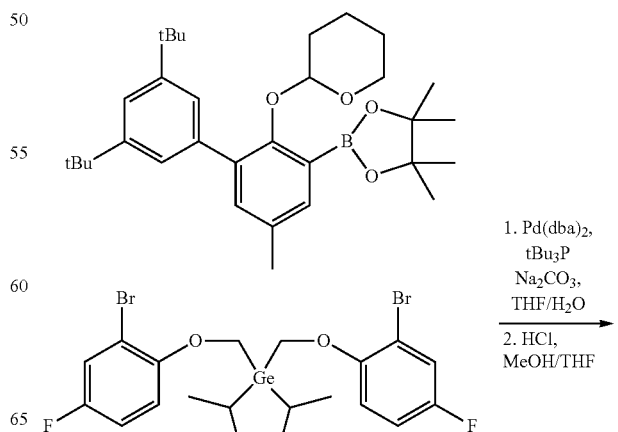

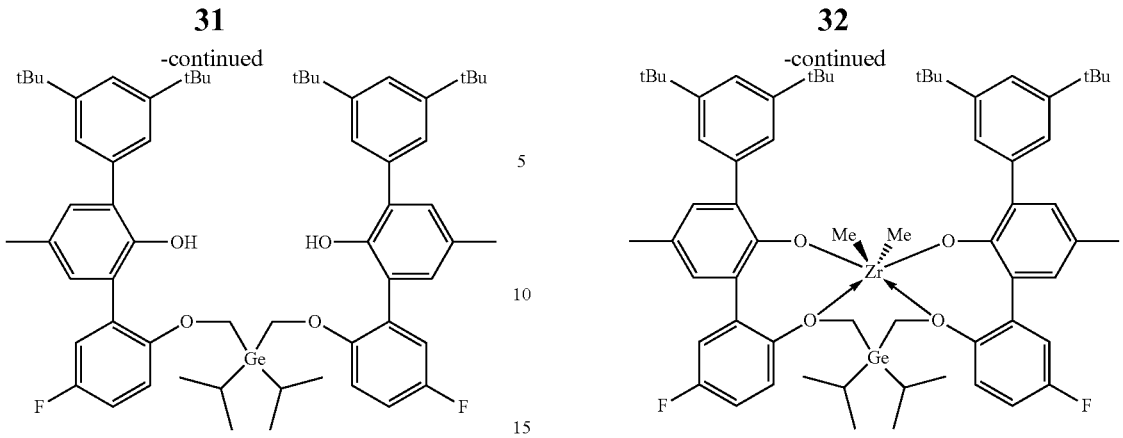

In a glovebox, to a 40 mL vial was added bis((2-bromo-4-fluorophenoxy) methyl)diisopropylgermane (1.7 g, 3.0 mmol, 1.0 equiv), 2-(3',5'-di-tert-butyl-5-methyl-2-((tetrahydro-2H-pyran-2-yl)oxy)-[1,1'-biphenyl]-3-yl)-4,4,5,5-tetramethyl-1,3,2-dioxaborolane (4.56 g, 9.0 mmol, 3.0 equiv), $Na_2CO_3$ (1.91 g, 18 mmol, 6 equiv), and degassed THF (12 mL). The vial was removed from the glovebox and water (6 mL) was added. Nitrogen was purged through the stirred solution for 5 min to ensure complete degassing. A pre-mixed solution of $Pd(dba)_2$ (0.069 g, 0.12 mmol, 0.04 equiv) and $t-Bu_3P$ (0.049 g, 0.24 mmol, 0.08 equiv) in THF (2 mL) was added. The reaction was stirred vigorously at 70° C. for 18 h. After cooling down to room temperature, the organic layer was transferred to a 100 mL round bottom flask, rinsed the vial with THF (4.0 mL). MeOH (15 mL) and concentrated HCl (1 mL) were added, then heated at reflux (80-90° C.) for 2 h. The reaction mixture was concentrated by rotary-evaporation. Water (50 mL) was added and the product was extracted by diethyl ether (70 mL×3). The extract was dried over $MgSO_4$ and filtered through a plug of silica gel. After the solvents were removed, the residue was purified by reverse phase column chromatography. A yield of 2.335 g of a white solid was collected (78% theoretical yield):

$^1H$ NMR (400 MHz, $CDCl_3$) δ 7.44 (t, J=1.8 Hz, 2H), 7.30 (d, J=1.8 Hz, 4H), 7.10-7.06 (m, 2H), 7.01 (dd, J=8.8, 3.2 Hz, 2H), 6.91-6.88 (m, 2H), 6.85-6.78 (m, 2H), 6.67-6.62 (m, 2H), 5.35 (s, 2H), 3.77 (s, 4H), 2.29 (s, 6H), 1.34 (s, 36H), 1.20-1.09 (m, 2H), 0.79 (d, J=7.4 Hz, 12H). $^{19}F\{^1H\}$ NMR (376 MHz, $CDCl_3$) δ−123.74 (s, 2F).

Example 15: Preparation of Comparative Catalyst C1: Step 5

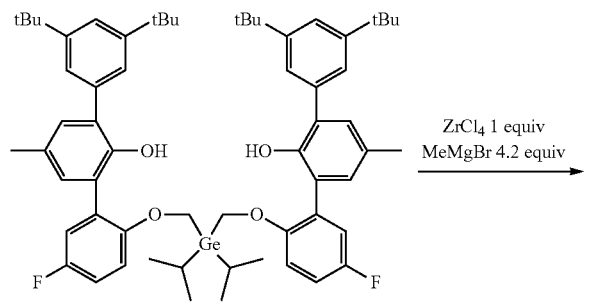

In a glovebox, an oven-dried 100 mL bottle with a stir bar was charged with $ZrCl_4$ (0.466 g, 2.0 mmol, 1.0 equiv) and anhydrous $CH_2Cl_2$ (50 mL). The vial was cooled to −30° C. in freezer for at least 30 minutes. The vial was removed from the freezer. MeMgBr (3 M in diethyl ether, 2.8 mL, 8.4 mmol, 4.2 equiv) was added to the stirred suspension. After 2 minutes, 6″,6″″-(((diisopropylgermanediyl)bis(methylene))bis(oxy))bis(3,5-di-tert-butyl-3″-fluoro-5'-methyl-[1,1':3',1″-terphenyl]-2'-ol) was added as solid. The resulting mixture was stirred at room temperature overnight. The reaction mixture was passed through a plug of CELITE™. The plug was washed with $CH_2Cl_2$ (10 mL). The solvent was removed under vacuum to yield a dark solid which was washed with hexane (20 mL) and then extracted with toluene (40 mL). The toluene extract was dried under vacuum. A yield of 1.584 g of a light brown solid was collected, providing a 71% yield.

$^1H$ NMR (400 MHz, $C_6D_6$) δ 8.07 (br s, 2H), 7.65 (t, J=1.8 Hz, 2H), 7.19 (d, J=2.4 Hz, 2H), 7.02 (dd, J=9.1, 3.1 Hz, 2H), 6.87-6.77 (m, 4H), 5.58-5.47 (m, 2H), 4.73 (d, J=11.7 Hz, 2H), 3.54 (d, J=11.6 Hz, 2H), 2.18 (s, 6H), 1.37 (s, 36H), 0.62-0.53 (m, 12H), 0.53-0.42 (m, 2H), 0.05 (s, 6H). $^{19}F\{^1H\}$ NMR (376 MHz, $C_6D_6$) δ−116.57 (m, 2F).

Example 16: Preparation of Comparative Catalyst C2

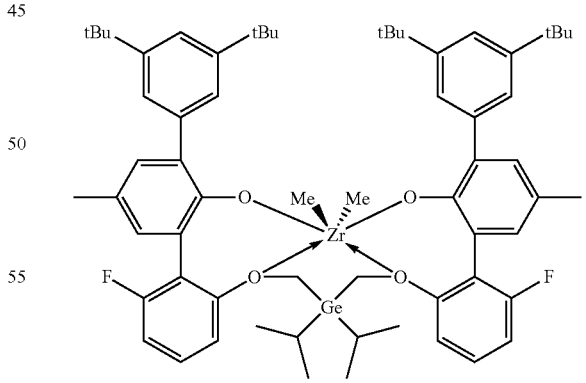

Comparative Catalyst C2 is prepared by following the general synthesis, shown in the FIGURE, using 2-bromo-3-fluorophenol in lieu of 2-bromo-4-fluorophenol with the same molar equivalence as in step 3 (Example 13).

$^1H$ NMR (400 MHz, $C_6D_6$) δ 7.99 (br s, 2H), 7.68 (t, J=1.8 Hz, 2H), 7.26-7.20 (m, 4H), 7.04-6.99 (m, 2H), 6.82-6.74 (m, 2H), 6.68-6.61 (m, 2H), 5.42 (d, J=8.3 Hz,

2H), 4.72 (d, J=11.6 Hz, 2H), 3.61 (d, J=11.5 Hz, 2H), 2.18 (s, 6H), 1.39 (br s, 36H), 0.65-0.45 (m, 14H), 0.02 (s, 6H). $^{19}$F{1H} NMR (376 MHz, C$_6$D$_6$) δ –112.81 (m, 2F).

Example 17: Preparation of Comparative Catalyst C3

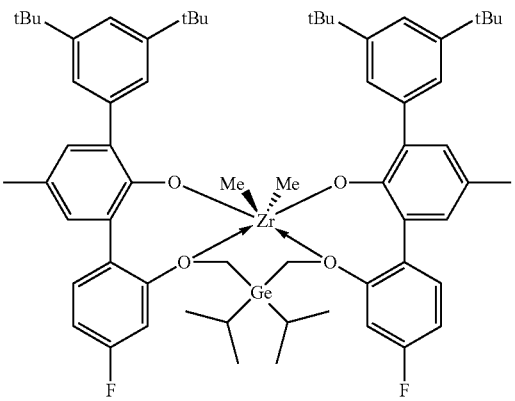

Comparative Catalyst C3 was prepared by following the general synthesis, shown in the FIGURE, using 2-bromo-5-fluorophenol in lieu of 2-bromo-4-fluorophenol with the same molar equivalence as in step 3 (Example 13).

$^1$H NMR (400 MHz, C$_6$D$_6$) δ 8.10 (br s, 2H), 7.90-7.84 (m, 2H), 7.56 (br s, 2H), 7.21 (d, J=2.3 Hz, 2H), 7.04-6.99 (m, 2H), 6.87 (d, J=2.4 Hz, 2H), 6.51 (td, J=8.3, 2.5 Hz, 2H), 5.46 (dd, J=9.1, 2.6 Hz, 2H), 4.80 (d, J=11.7 Hz, 2H), 3.62 (d, J=11.6 Hz, 2H), 2.21 (s, 6H), 1.48 (br s, 36H), 0.61-0.42 (m, 14H), 0.10 (s, 6H). $^{19}$F{1H} NMR (376 MHz, C$_6$D$_6$) δ –109.86 (m, 2F).

Example 18: Preparation of Comparative Catalyst C4

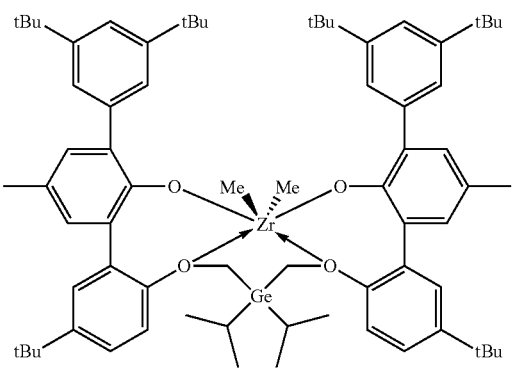

Comparative Catalyst C4 was prepared by following the general synthesis, shown in the FIGURE, using 2-bromo-4-(t-butyl)phenol in lieu of 2-bromo-4-fluorophenol in step 3 with the same molar equivalence (Example 13).

$^1$H NMR (400 MHz, CDCl$_3$) δ 7.79 (t, J=1.8 Hz, 2H), 7.55 (d, J=2.5 Hz, 2H), 7.28-7.18 (m, 5H), 7.08-6.98 (m, 3H), 5.68 (d, J=8.6 Hz, 2H), 4.81 (d, J=11.6 Hz, 2H), 3.67 (d, J=11.6 Hz, 2H), 2.26 (s, 6H), 1.46 (s, 36H), 1.25 (s, 18H), 0.67-0.52 (m, 14H), –0.05 (m, 6H).

Example 19: Preparation of Comparative Catalyst C5

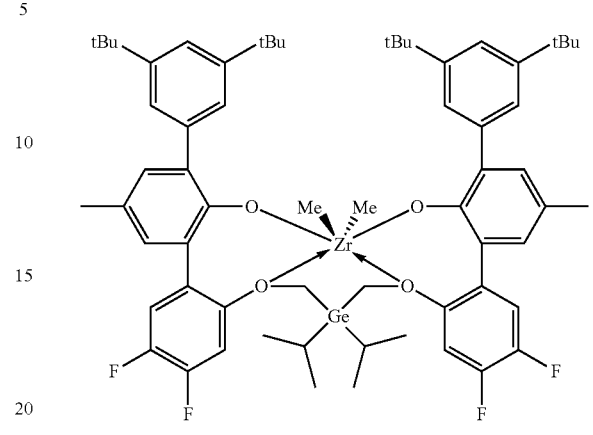

Comparative Catalyst C5 was prepared by following the general synthesis, shown in the FIGURE, using 2-bromo-4,5-difluorophenol in lieu of 2-bromo-4-fluorophenol in step 3 with the same molar equivalence (Example 13).

$^1$H NMR (400 MHz, C$_6$D$_6$) δ 7.85-7.82 (m, 2H), 7.06-6.99 (m, 6H), 6.90 (dd, J=10.8, 8.8 Hz, 2H), 6.72-6.68 (m, 2H), 5.45 (dd, J=10.4, 6.9 Hz, 2H), 4.71 (d, J=11.7 Hz, 2H), 3.52 (d, J=11.6 Hz, 2H), 2.17 (s, 6H), 1.59-1.23 (m, 36H), 0.59-0.51 (m, 12H), 0.48-0.37 (m, 2H), 0.11 (s, 6H). $^{19}$F{1H} NMR (376 MHz, C$_6$D$_6$) δ –133.64 (d, J=22.5 Hz, 2F), –140.19 (d, J=22.4 Hz, 2F).

Example 20: Preparation of Procatalyst 1

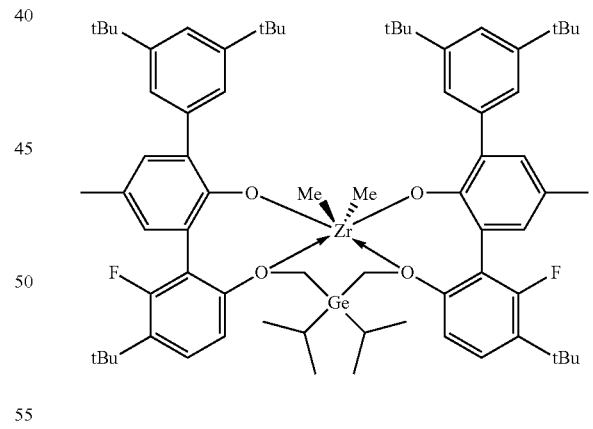

Procatalyst 1 was prepared by following the general synthesis shown in the FIGURE using 2-bromo-4-(t-butyl)-3-fluorophenol in lieu of 2-bromo-4-fluorophenol with the same molar equivalence as in step 3 (Example 13).

$^1$H NMR (400 MHz, C$_6$D$_6$) δ 7.96 (br s, 2H), 7.75 (t, J=1.8 Hz, 2H), 7.37-7.30 (m, 2H), 7.24 (d, J=2.3 Hz, 2H), 7.11-7.00 (m, 4H), 5.48 (d, J=8.7 Hz, 2H), 4.70 (d, J=11.4 Hz, 2H), 3.64 (d, J=11.4 Hz, 2H), 2.20 (s, 6H), 1.59-1.30 (m, 54H), 0.66-0.49 (m, 14H), –0.05 (s, 6H). $^{19}$F{1H} NMR (376 MHz, C$_6$D$_6$) δ –108.61 (m, 2F).

Example 21: Preparation of Procatalyst 2

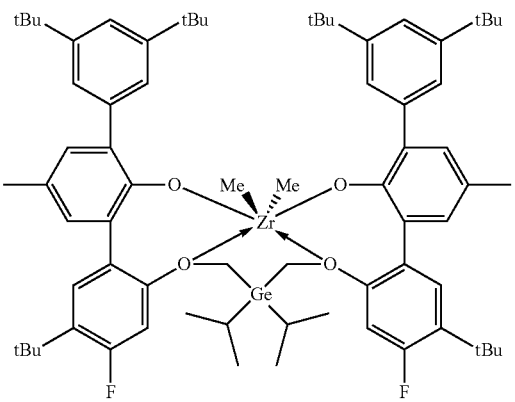

Procatalyst 2 was prepared by following the general synthesis shown in the FIGURE using 2-bromo-4-(t-butyl)-5-fluorophenol in lieu of 2-bromo-4-fluorophenol with the same molar equivalence as in step 3 (Example 13).

$^1$H NMR (400 MHz, C$_6$D$_6$) δ 8.18 (br s, 2H), 7.93-7.85 (m, 2H), 7.59 (br s, 2H), 7.42 (d, J=9.1 Hz, 2H), 7.24 (d, J=2.4 Hz, 2H), 7.08-6.98 (m, 2H), 5.51 (d, J=12.3 Hz, 2H), 4.81 (d, J=11.6 Hz, 2H), 3.67 (d, J=11.7 Hz, 2H), 2.22 (s, 6H), 1.51 (br s, 36H), 1.30 (s, 18H), 0.64-0.45 (m, 14H), 0.08 (s, 6H). $^{19}$F{1H} NMR (376 MHz, C$_6$D$_6$) δ −105.56 (m, 2F).

Example 22: Preparation of Procatalyst 3

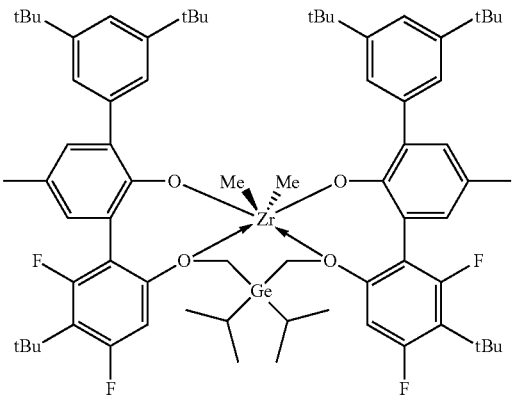

Procatalyst 3 was prepared by following the general synthesis, shown in the FIGURE, using 2-bromo-4-(t-butyl)-3,5-difluorophenol in lieu of 2-bromo-4-fluorophenol with the same molar equivalence as in step 3 (Example 13).

$^1$H NMR (400 MHz, C$_6$D$_6$) δ 8.04 (br s, 2H), 7.83 (br s, 2H), 7.24-7.18 (m, 4H), 7.08-6.98 (m, 2H), 5.32 (dd, J=13.0, 1.8 Hz, 2H), 4.68 (d, J=11.5 Hz, 2H), 3.62 (d, J=11.5 Hz, 2H), 2.18 (s, 6H), 1.63-1.36 (m, 54H), 0.65-0.45 (m, 14H), 0.10 (s, 6H). $^{19}$F{1H} NMR (376 MHz, C$_6$D$_6$) δ −102.26 (d, J=7.0 Hz, 2F), −104.70 (d, J=7.0 Hz, 2F).

Example 23: Preparation of Comparative Procatalyst C10

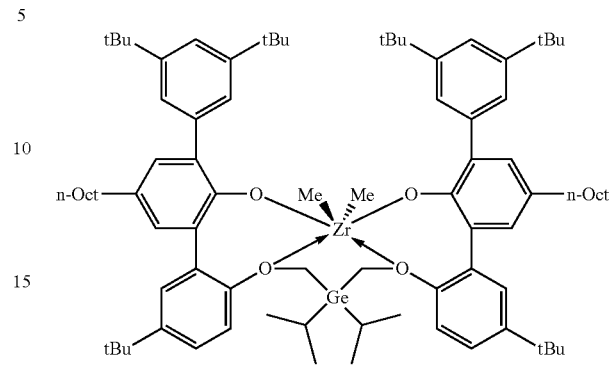

Comparative Catalyst C10 was prepared by following the general synthesis, shown in the FIGURE, using 2-bromo-4-(t-butyl)phenol in lieu of 2-bromo-4-fluorophenol with the same molar equivalence as in step 3 (Example 13), and 2-(3',5'-di-tert-butyl-5-octyl-2-((tetrahydro-2H-pyran-2-yl)oxy)-[1,1'-biphenyl]-3-yl)-4,4,5,5-tetramethyl-1,3,2-dioxaborolane in lieu of 2-(3',5'-di-tert-butyl-5-methyl-2-((tetrahydro-2H-pyran-2-yl)oxy)-[1,1'-biphenyl]-3-yl)-4,4,5,5-tetramethyl-1,3,2-dioxaborolane in the same molar equivalence as in step 4 (Example 14).

$^1$H NMR (400 MHz, CDCl$_3$) δ 8.14 (br s, 2H), 7.80 (t, J=1.9 Hz, 2H), 7.59 (d, J=2.5 Hz, 2H), 7.34 (dd, J=19.0, 2.4 Hz, 4H), 7.20 (dd, J=8.6, 2.5 Hz, 2H), 5.70 (d, J=8.6 Hz, 2H), 4.86 (d, J=11.6 Hz, 2H), 3.71 (d, J=11.5 Hz, 2H), 2.72-2.54 (m, 4H), 1.75-1.21 (m, 78H), 0.95-0.87 (m, 6H), 0.72-0.59 (m, 14H), −0.03 (s, 6H).

Example 24: Preparation of Procatalyst 4

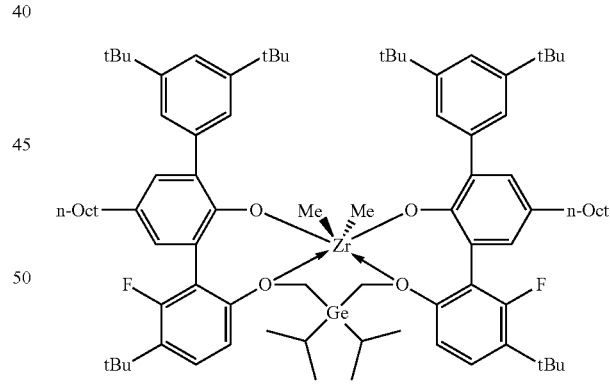

Procatalyst 4 was prepared by following the general synthesis, shown in the FIGURE, using 2-bromo-4-(t-butyl)-3-fluorophenol in lieu of 2-bromo-4-fluorophenol with the same molar equivalence as in step 3 (Example 13), and 2-(3',5'-di-tert-butyl-5-octyl-2-((tetrahydro-2H-pyran-2-yl)oxy)-[1,1'-biphenyl]-3-yl)-4,4,5,5-tetramethyl-1,3,2-dioxaborolane in lieu of 2-(3',5'-di-tert-butyl-5-methyl-2-((tetrahydro-2H-pyran-2-yl)oxy)-[1,1'-biphenyl]-3-yl)-4,4,5,5-tetramethyl-1,3,2-dioxaborolane in the same molar equivalence as in step 4 (Example 14).

$^1$H NMR (400 MHz, C$_6$D$_6$) δ 8.04 (br s, 2H), 7.76 (t, J=1.9 Hz, 2H), 7.61 (br s, 2H), 7.43 (t, J=2.8 Hz, 2H), 7.34

(d, J=2.4 Hz, 2H), 7.08 (t, J=8.8 Hz, 2H), 5.50 (dd, J=8.8, 1.1 Hz, 2H), 4.75 (d, J=11.5 Hz, 2H), 3.69 (d, J=11.4 Hz, 2H), 2.69-2.49 (m, 4H), 1.71-1.60 (m, 4H), 1.58-1.19 (m, 74H), 0.96-0.87 (m, 6H), 0.73-0.57 (m, 14H), −0.04 (s, 6H). $^{19}F\{1H\}$ NMR (376 MHz, $C_6D_6$) δ-108.63 (m, 2F).

Example 25: Preparation of Procatalyst 5

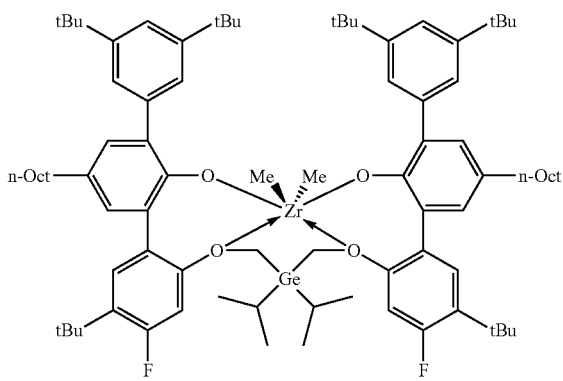

Procatalyst 5 was prepared by following the general synthesis, shown in the FIGURE, using 22-bromo-4-(t-butyl)-5-fluorophenol in lieu of 2-bromo-4-fluorophenol with the same molar equivalence as in step 3 (Example 13), and 2-(3',5'-di-tert-butyl-5-octyl-2-((tetrahydro-2H-pyran-2-yl)oxy)-[1,1'-biphenyl]-3-yl)-4,4,5,5-tetramethyl-1,3,2-dioxaborolane in lieu of 2-(3',5'-di-tert-butyl-5-octyl-2-((tetrahydro-2H-pyran-2-yl)oxy)-[1,1'-biphenyl]-3-yl)-4,4,5,5-tetramethyl-1,3,2-dioxaborolane in the same molar equivalence as in step 4 (Example 14).

$^1$H NMR (400 MHz, $C_6D_6$) δ 8.21 (br s, 2H), 7.93-7.86 (m, 2H), 7.63 (br s, 2H), 7.46 (d, J=9.2 Hz, 2H), 7.34 (d, J=2.4 Hz, 2H), 7.21 (d, J=2.4 Hz, 2H), 7.08-6.94 (m, 2H), 5.54 (d, J=12.3 Hz, 2H), 4.86 (d, J=11.7 Hz, 2H), 3.72 (d, J=11.7 Hz, 2H), 2.69-2.51 (m, 4H), 1.74-1.19 (m, 78H), 0.96-0.86 (m, 6H), 0.69-0.53 (m, 14H), 0.10 (s, 6H). $^{19}F\{1H\}$NMR (376 MHz, $C_6D_6$) δ−105.54 (m, 2F).

Example 26: Preparation of Procatalyst 7

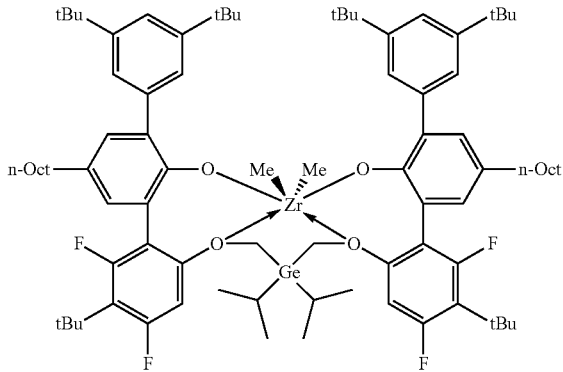

Procatalyst 7 was prepared by following the general synthesis, shown in the FIGURE, using 2-bromo-4-(t-butyl)-3,5-difluorophenol in lieu of 2-bromo-4-fluorophenol with the same molar equivalence as in step 3 (Example 13), and 2-(3',5'-di-tert-butyl-5-octyl-2-((tetrahydro-2H-pyran-2-yl)oxy)-[1,1'-biphenyl]-3-yl)-4,4,5,5-tetramethyl-1,3,2-dioxaborolane in lieu of 2-(3',5'-di-tert-butyl-5-octyl-2-((tetrahydro-2H-pyran-2-yl)oxy)-[1,'-biphenyl]-3-yl)-4,4,5,5-tetramethyl-1,3,2-dioxaborolane in the same molar equivalence as in step 4 (Example 14).

$^1$H NMR (400 MHz, $C_6D_6$) δ 8.09 (br s, 2H), 7.87-7.81 (m, 2H), 7.58 (br s, 2H), 7.34-7.27 (m, 4H), 5.35 (dd, J=12.9, 1.8 Hz, 2H), 4.74 (d, J=11.5 Hz, 2H), 3.68 (d, J=11.5 Hz, 2H), 2.66-2.47 (m, 4H), 1.73-1.18 (m, 78H), 0.96-0.85 (m, 6H), 0.71-0.51 (m, 14H), 0.12 (s, 6H). $^{19}F\{1H\}$ NMR (376 MHz, $C_6D_6$) δ−102.23 (d, J=7.1 Hz, 2F), −104.67 (d, J=7.1 Hz, 2F).

Representative Example: Synthesis of Procatalyst 3

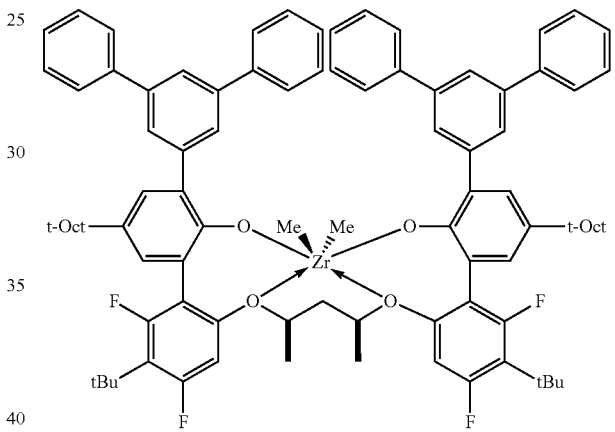

Example 27: Preparation of 5,5'-((meso-pentane-2,4-diyl)bis(oxy))bis(4-bromo-2-(tert-butyl)-1,3-difluorobenzene): Step 1b

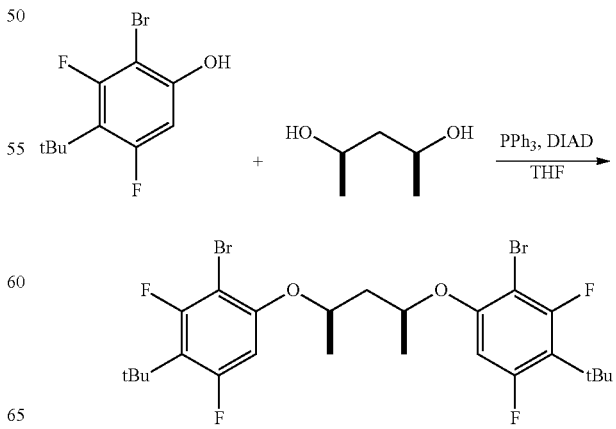

Dry THF (25 mL) was added to a 250 mL round bottom flask charged with 2-bromo-4-(tert-butyl)-3,5-difluorophenol (2.51 g, 9.48 mmol), PPh$_3$ (2.49 g, 9.48 mmol), and meso-pentane-2,4-diol (0.47 g, 4.51 mmol). The mixture was cooled to 0° C. then the diisopropyl azodicarboxylate (DIAD) (1.87 mL, 9.48 mmol) was added. The reaction was stirred overnight while the cold bath slowly expired. The volatiles were then removed under reduced pressure. Hexanes (5 mL) was added to the crude residue, which was subsequently removed under reduced pressure (repeated this five times) then dried the residue under high vacuum. The residue was treated with hexanes (15 mL) and triturated, which caused the formation of a white precipitate. The solid (PPh$_3$O) was removed by filtration and the initial flask and solid were washed with hexanes (2×25 mL). The hexanes filtrate was concentrated to dryness, the residue was dry loaded onto CELITE then purified using flash column chromatography (40 g SiO$_2$, 40 mL/min, 0% EtOAc to 20% EtOAc in hexanes). The product appeared to still contain some impurities. The sticky solid material was taken up in acetonitrile (CH$_3$CN) (10 mL), and the product was insoluble while most of the contaminants were soluble. The insoluble product was collected by filtration and washed with CH$_3$CN (2×4 mL) to provide 1.75 g (65% theoretical yield) of the product as a white solid.

$^1$H NMR (400 MHz, CDCl$_3$) δ 6.56 (dd, J=14.7, 2.1 Hz, 2H), 4.57 (h, J=6.2 Hz, 2H), 2.39 (dt, J=13.8, 6.8 Hz, 1H), 1.85 (dt, J=14.2, 5.9 Hz, 1H), 1.45 (t, J=2.3 Hz, 18H), 1.39 (d, J=6.1 Hz, 6H). $^{19}$F {1H} NMR (376 MHz, CDCl$_3$) δ −96.89 (d, J=6.9 Hz),−105.82 (d, J=8.1 Hz).

Example 28: Preparation of 6,6''''-((meso-pentane-2,4-diyl)bis(oxy))bis(3-(tert-butyl)-2,4-difluoro-5''-phenyl-5'-(2,4,4-trimethylpentan-2-yl)-[1,1':3',1'':3'',1'''-quaterphenyl]-2'-ol): Step 4

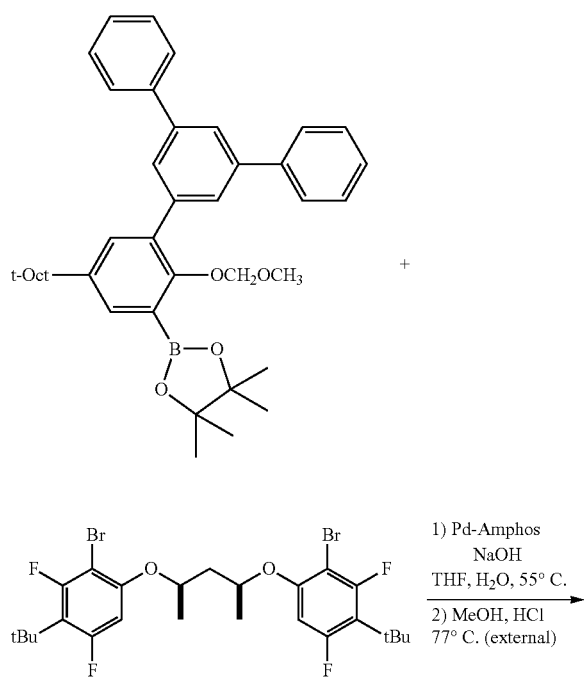

Degassed THF (12 mL) and degassed water (3 mL) were added to a 40 mL round bottom flask that was charged with the boronic ester (0.82 g, 1.36 mmol), 5,5'-((meso-pentane-2,4-diyl)bis(oxy))bis(4-bromo-2-(tert-butyl)-1,3-difluorobenzene) (0.33 g, 0.540 mmol), solid NaOH (0.11 g, 2.72 mmol), and chloro(crotyl)[di-tert-butyl(4-dimethylaminophenyl)phosphine]palladium(II) (Pd-Amphos) (0.01 g, 0.02 mmol). The reaction was warmed to 55° C., and maintained at this temperature for 18 h. After this time, the reaction was cooled to room temperature. The mixture was transferred to a separatory funnel, toluene (25 mL) and water (10 mL) were added, and the layers were separated. The organics were washed with brine (10 mL), dried (Na$_2$SO$_4$), and filtered.

To the above solution, MeOH (10 mL) was added along with concentrated HCl (8 drops from a glass pipet). The flask was fitted with a reflux condenser and warmed to 77° C. (external temperature). The solution was held at this temperature for 6 h while stirring. The solution was cooled to room temperature then the solvent was removed under reduced pressure. The residue was dry loaded onto CELITE™ then purified directly using reverse phase flash chromatography (50 g C18 modified silica, 35 mL/min, 0% THF to 50% THF in CH$_3$CN over 20 min), which provided 0.61 g (86% theoretical yield) of the ligand as a white solid.

$^1$H NMR (400 MHz, CDCl$_3$) δ 7.81-7.73 (m, 6H), 7.70-7.61 (m, 8H), 7.51-7.29 (m, 14H), 7.16-7.07 (m, 2H), 6.38-6.16 (m, 2H), 5.15 (d, J=4.6 Hz, 1H), 5.07 (d, J=2.0 Hz, 1H), 4.45-4.18 (m, 2H), 2.04-1.90 (m, 1H), 1.81-1.63 (m, 4H), 1.60-1.20 (m, 31H), 1.15 (dd, J=6.1, 3.5 Hz, 3H), 1.09 (dd, J=9.9, 6.0 Hz, 3H), 0.83-0.65 (m, 18H). $^{19}$F {1H} NMR (376 MHz, CDCl$_3$) δ −103.88,−104.01 (m),−104.06 (d, J=8.1 Hz),−104.11 (d, J=8.1 Hz), −104.23 (t, J=7.0 Hz). LCMS (ES/APCIMS m/z 1329 [(M+Na)$^+$].

Example 29: Preparation of Procatalyst 3

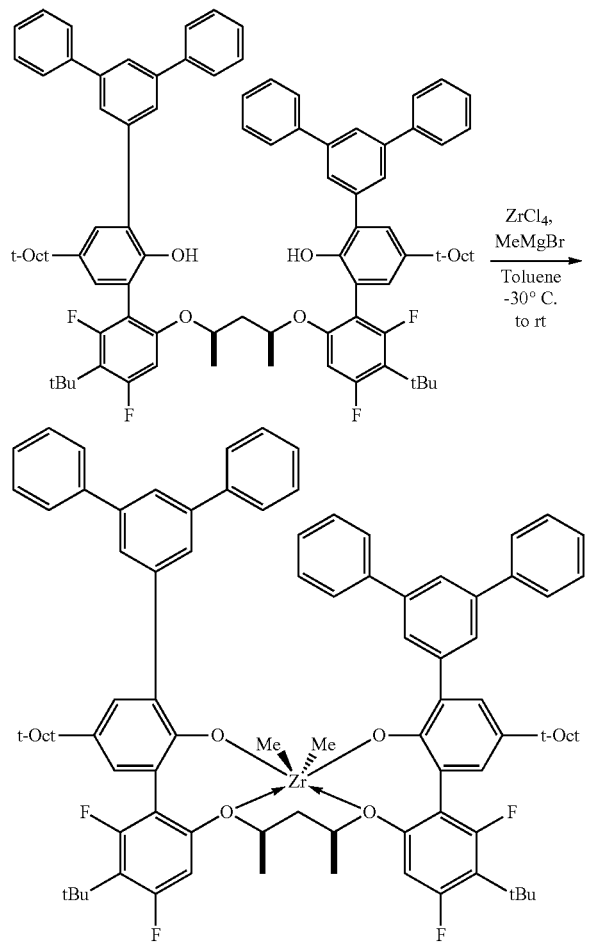

The starting material for the reaction in Example 29 was prepared by following the general synthesis using 2-bromo-3,5-difluorophenol in lieu of 2-bromo-4-(tert-butyl)-3,5-difluorophenol in the same molar equivalence in step 1b (Example 27) and 2-(2-(methoxymethoxy)-5'-phenyl-5-(2,4,4-trimethylpentan-2-yl)-[1,1':3',1''-terphenyl]-3-yl)-4,4,5,5-tetramethyl-1,3,2-dioxaborolane in the same molar equivalence in step 4 (Example 28).

Metallation reaction: 3M MeMgBr in Et$_2$O (0.35 mL) was added to a −30° C. solution of ZrCl$_4$ (0.059 g, 0.28 mmol) in toluene (6 mL). After stirring for 3 minutes a −30° C. toluene (2 mL) solution of the ligand (0.33 g, 0.28 mmol) was added. The reaction was stirred at room temperature for 5 h then the solvent was removed under vacuum. The resulting residue was taken up in hexanes (10 mL), and most of the material was insoluble. The heterogeneous mixture was passed through a CELITE™-packed fritted funnel plug. The CELITE™ plug was washed with hexanes (10 mL). A new collection vial was used, and the CELITE™ plug was extracted with CH$_2$Cl$_2$ (2×15 mL). The CH$_2$Cl$_2$ extracts were removed under reduced pressure to yield 0.25 g (69% theoretical yield) of the procatalyst as a white solid.

$^1$H NMR (400 MHz, CDCl$_3$) δ 8.25-7.98 (m, 4H), 7.99-7.92 (m, 1H), 7.92-7.84 (m, 1H), 7.81-7.67 (m, 8H), 7.63-7.53 (m, 2H), 7.46-7.37 (m, 8H), 7.37-7.26 (m, 4H), 7.15-7.06 (m, 2H), 4.85 (app dd, J=13.1, 1.8 Hz, 1H), 4.69 (app dd, J=13.2, 1.8 Hz, 1H), 4.14-3.98 (m, 1H), 3.64-3.39 (m, 1H), 1.84 (app d, J=14.5 Hz, 2H), 1.70 (app dd, J=17.9, 14.5 Hz, 2H), 1.52-1.16 (m, 31H), 1.13-0.97 (m, 1H), 0.83-0.65 (m, 21H), 0.59 (d, J=6.7 Hz, 3H), −0.77 (s, 3H), −0.92 (s, 3H). $^{19}$F {1H} NMR (376 MHz, CDCl$_3$) δ −105.23 (dd, J=10.0, 6.8 Hz), −105.99 (d, J=6.7 Hz), −106.09 (d, J=6.6 Hz).

Example 30: Preparation of Procatalyst 6

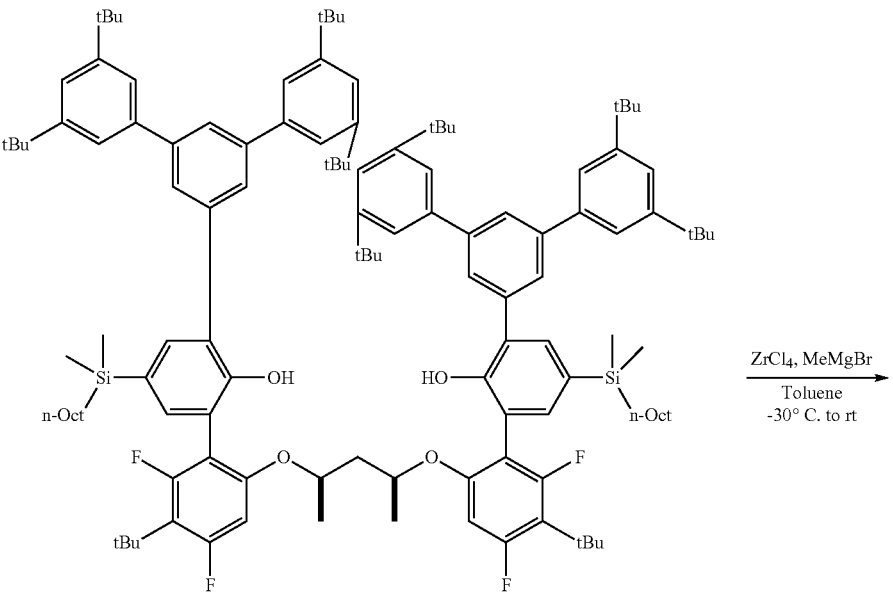

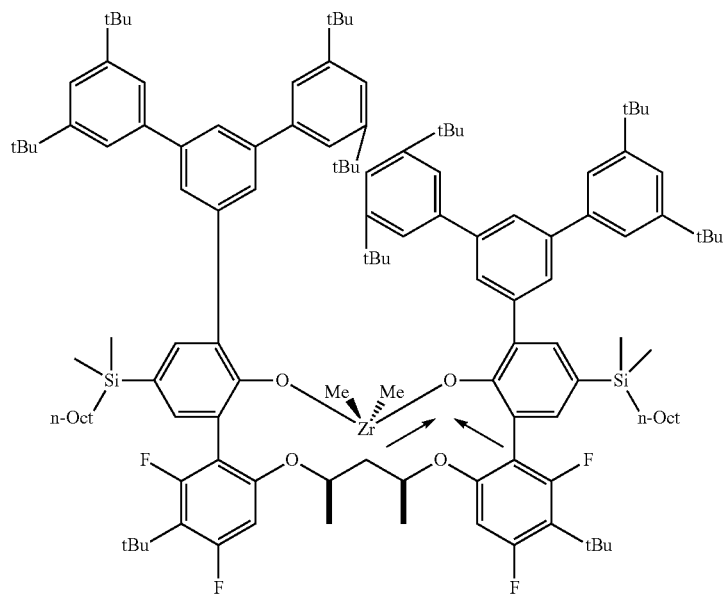

The starting material for the reaction in Example 30 was prepared by following the general synthesis using 2-bromo-4-(t-butyl)-3,5-difluorophenol in lieu of 2-bromo-4-(tert-butyl)-3,5-difluorophenol in the same molar equivalence in step 1b (Example 27) and (3",5"-di-tert-butyl-5'-(3,5-di-tert-butylphenyl)-6-((tetrahydro-2H-pyran-2-yl)oxy)-5-(4,4,5,5-tetramethyl-1,3,2-dioxaborolan-2-yl)-[1,1':3',1"-terphenyl]-3-yl)dimethyl(octyl)silane in the same molar equivalence in step 4 (Example 28).

Metallation reaction: 3M MeMgBr in Et$_2$O (0.2 mL) was added to a –30° C. solution of ZrCl$_4$ (0.035 g, 0.148 mmol) in toluene (5 mL). After stirring for 5 minutes a –30° C. toluene (2 mL) solution of the ligand (0.28 g, 0.147 mmol) was added. The mixture was stirred for 3 h then the solvent was removed under vacuum. The resulting residue was taken up in hexanes (25 mL) then the solution was passed through a CELITE™-packed fritted funnel plug. The CELITE™ plug was washed with hexanes (20 mL). The hexanes was removed under reduced pressure to provide 0.26 g (89% theoretical yield) of the procatalyst as a brown solid.

$^1$H NMR (400 MHz, C$_6$D$_6$) δ 8.73-8.36 (m, 2H), 8.34-8.29 (m, 1H), 8.29-8.23 (m, 1H), 8.10 (app dd, J=10.7, 1.7 Hz, 2H), 7.96-7.74 (m, 9H), 7.62-7.50 (m, 5H), 5.73 (dd, J=13.2, 1.8 Hz, 1H), 5.42 (dd, J=13.3, 1.9 Hz, 1H), 4.36-4.20 (m, 1H), 3.85-3.70 (m, 1H), 1.47-1.25 (m, 114H), 1.09-0.97 (m, 1H), 0.96-0.67 (m, 13H), 0.46 (d, J=6.7 Hz, 3H), 0.43-0.34 (m, 1H), 0.33-0.22 (m, 12H), 0.02 (s, 3H), –0.13 (s, 3H). $^{19}$F {1H} NMR (376 MHz, C$_6$D$_6$) δ –103.88 (d, J=6.3 Hz), –104.41 (d, J=6.7 Hz), –105.49 (d, J=6.7 Hz), –106.82 (d, J=6.3 Hz).

Example 31: Preparation of Comparative Catalyst C7

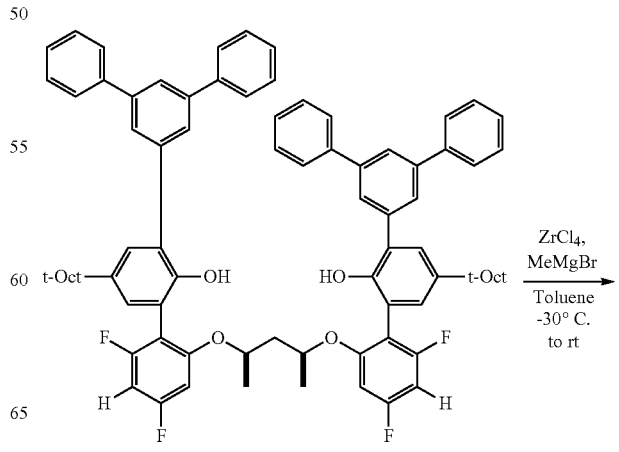

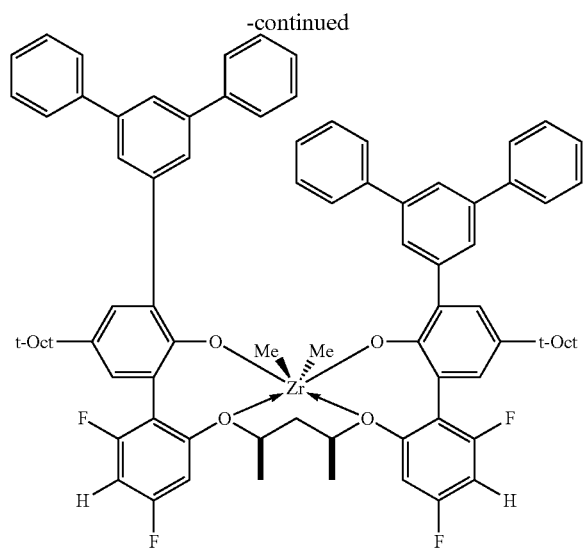

The starting material for the reaction in Example 31 was prepared by following the general synthesis using 2-bromo-3,5-difluorophenol in lieu of 2-bromo-4-(tert-butyl)-3,5-difluorophenol in the same molar equivalence in step 1b (Example 27) and 2-(2-(methoxymethoxy)-5'-phenyl-5-(2,4,4-trimethylpentan-2-yl)-[1,1':3',1"-terphenyl]-3-yl)-4,4,5,5-tetramethyl-1,3,2-dioxaborolane in the same molar equivalence in step 4 (Example 28).

Metallation Reaction:

3M MeMgBr in $Et_2O$ (0.41 mL) was added to a −30° C. solution of $ZrCl_4$ (0.071 g, 0.30 mmol) in toluene (6 mL). After stirring for 4 minutes a −30° C. toluene (2 mL) solution of the ligand (0.36 g, 0.30 mmol) was added to the solution. The resulting mixture was stirred for 4 h then the solvent was removed under vacuum. The resulting residue was taken up in hexanes/toluene (2:1, 30 mL) then the solution was passed through a CELITE™-packed fritted funnel plug. The CELITE™ plug was washed with hexanes/toluene (1:1, 10 mL). The solvent was removed under reduced pressure to afford a tan material that contains some impurities. The material was taken up in hexanes/toluene (4:1, 10 mL). This solution was passed through a CELITE™-packed fritted funnel plug. The CELITE™ plug was washed with hexanes/toluene (4:1, 5 mL). The combined filtrate and washings were concentrated to dryness under reduced pressure to provide 0.27 g (67% theoretical yield) of the desired procatalyst as a tan solid.

$^1$H NMR (400 MHz, $C_6D_6$) δ 8.53-8.21 (m, 4H), 8.21-8.15 (m, 1H), 8.15-8.10 (m, 1H), 7.87-7.63 (m, 10H), 7.40 (app t, J=2.7 Hz, 1H), 7.32-7.24 (m, 9H), 7.18-7.16 (m, 4H), 6.39-6.13 (m, 2H), 5.33-5.18 (m, 1H), 5.11-4.94 (m, 1H), 4.22 (p, J=6.8 Hz, 1H), 3.73-3.56 (m, 1H), 1.88-1.55 (m, 4H), 1.44-1.38 (m, 6H), 1.36 (s, 3H), 1.32 (s, 3H), 1.11 (ddd, J=16.3, 11.5, 8.7 Hz, 1H), 0.87 (s, 9H), 0.77 (s, 9H), 0.58-0.42 (m, 4H), 0.33 (d, J=6.7 Hz, 3H), −0.12 (s, 3H), −0.25 (s, 3H).

$^{19}$F {1H} NMR (376 MHz, $C_6D_6$) δ −109.52 (d, J=5.9 Hz), −110.08 (d, J=5.9 Hz), −110.16 (d, J=5.9 Hz), −111.06 (d, J=6.4 Hz).

Procedure for Batch Reactor Polymerization

Raw materials (ethylene, 1-octene) and the process solvent (a narrow boiling range high-purity isoparaffinic solvent trademarked ISOPAR E commercially available from ExxonMobil Corporation) were purified with molecular sieves before introduction into the reaction environment. A one gallon (3.79 L) stirred autoclave reactor was charged with ISOPAR E, and 1-octene. The reactor was then heated to the desired temperature and charged with ethylene to bring the total pressure to ca 420 psig. The catalyst composition was prepared in a drybox under inert atmosphere by mixing the desired metal-ligand complex and a co-catalyst ([HNMe($C_{18}H_{37}$)$_2$][B($C_6F_5$)$_4$] along with modified methylaluminoxane (MMAO), with additional solvent to give a total volume of about 15-20 mL. The activated catalyst mixture was then quick-injected into the reactor. The reactor pressure and temperature were kept constant by feeding ethylene during the polymerization and cooling the reactor as needed. After 10 minutes, the ethylene feed was shut off and the solution transferred into a nitrogen-purged resin kettle. The polymer was thoroughly dried in a vacuum oven, and the reactor was thoroughly rinsed with hot ISOPAR E between polymerization runs.

Procedure for Miniplant Polymerization

Raw materials (ethylene, 1-octene) and the process solvent (a narrow boiling range high-purity isoparaffinic solvent trademarked Isopar E commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 525 psig. The solvent and comonomer (1-octene) feed is pressurized via mechanical positive displacement pump to above reaction pressure at 525 psig. MMAO, commercially available from AkzoNobel, was used as an impurity scavenger. The individual catalyst components (procatalyst or cocatalyst) were manually batch diluted to specified component concentrations with purified solvent (Isopar E) and pressured to above reaction pressure at 525 psig. The cocatalyst is [HNMe($C_{18}H_{37}$)$_2$][B($C_6F_5$)$_4$], commercially available from Boulder Scientific, and was used at a 1.2 molar ratio relative to the metal-ligand complex of formula (I). All reaction feed flows were measured with mass flow meters and independently controlled with computer automated valve control systems.

The continuous solution polymerizations were carried out in a 5 liter (L) continuously stirred-tank reactor (CSTR). The reactor has independent control of all fresh solvent, monomer, comonomer, hydrogen, and catalyst component feeds. The combined solvent, monomer, comonomer and hydrogen feed to the reactor is temperature controlled to anywhere between 5° C. to 50° C. and typically 25° C. The fresh comonomer feed to the polymerization reactor is fed in with the solvent feed. The fresh solvent feed is controlled typically with each injector receiving half of the total fresh feed mass flow. The cocatalyst is fed based on a calculated specified molar ratio (1.2 molar equivalents) to the metal-ligand complex of formula (I). Immediately following each fresh injection location, the feed streams are mixed with the circulating polymerization reactor contents with static mixing elements. The effluent from the polymerization reactor (containing solvent, monomer, comonomer, hydrogen, catalyst components, and molten polymer) exits the first reactor loop and passes through a control valve (responsible for maintaining the pressure of the first reactor at a specified target). As the stream exits the reactor it is contacted with water to stop the reaction. In addition, various additives, such as antioxidants, could be added at this point. The stream then went through another set of static mixing elements to evenly disperse the catalyst kill and additives.

Following additive addition, the effluent (containing solvent, monomer, comonomer, hydrogen, catalyst components, and molten polymer) passed through a heat exchanger to raise the stream temperature in preparation for separation of the polymer from the other lower boiling reaction components. The stream then entered a two stage separation and devolatization system where the polymer was removed from the solvent, hydrogen, and unreacted monomer and comonomer. The separated and devolatized polymer melt was pumped through a die specially designed for underwater pelletization, cut into uniform solid pellets, dried, and transferred into a box for storage.

Catalyst efficiency and the resulting polymer characteristics were assessed for Procatalysts 1-7, each having a structure according to formula (I) with an alkyl in the $B^{1-2}$ positions and at least two fluorine atoms in $A^{1-4}$ positions. The Comparative Procatalysts C1-C9 had the following structures:

Comparative Procatalyst C1
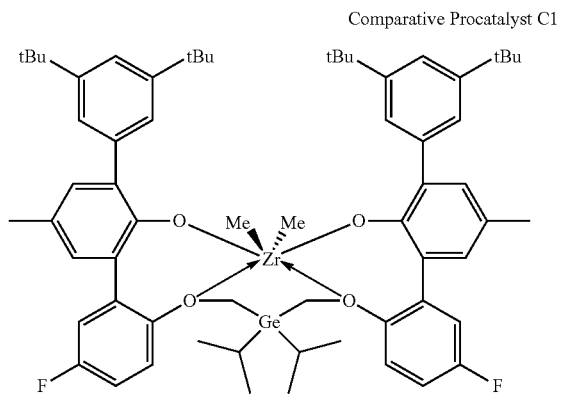

Comparative Procatalyst C2
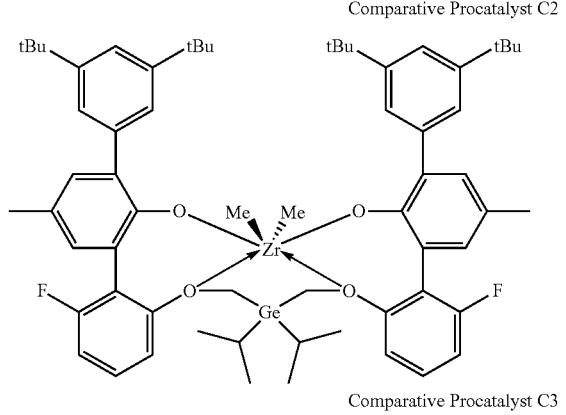

Comparative Procatalyst C3
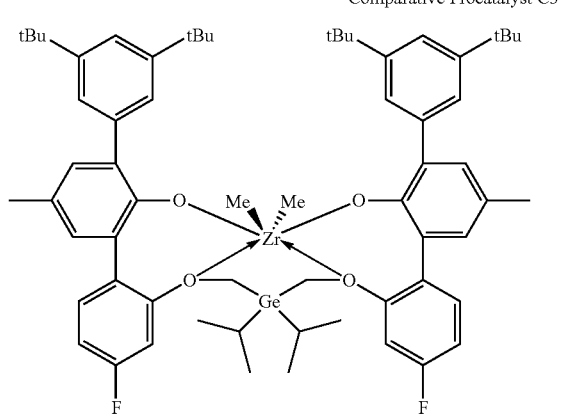

Comparative Procatalyst C4
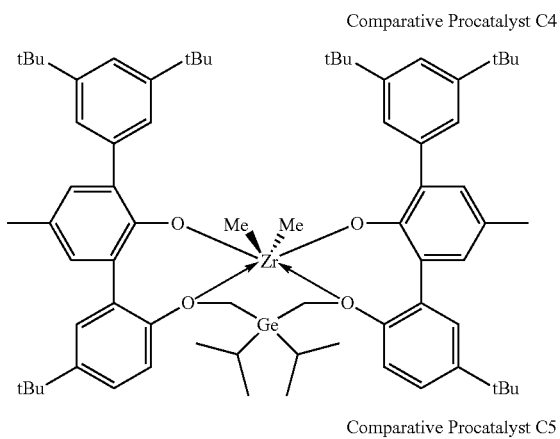

Comparative Procatalyst C5

Comparative Procatalyst C6

Comparative Procatalyst C7
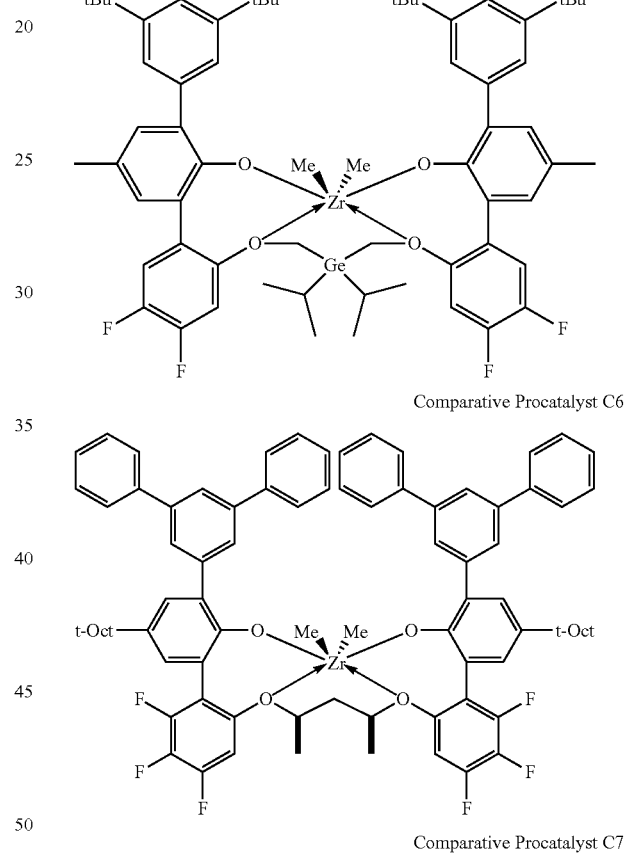

-continued

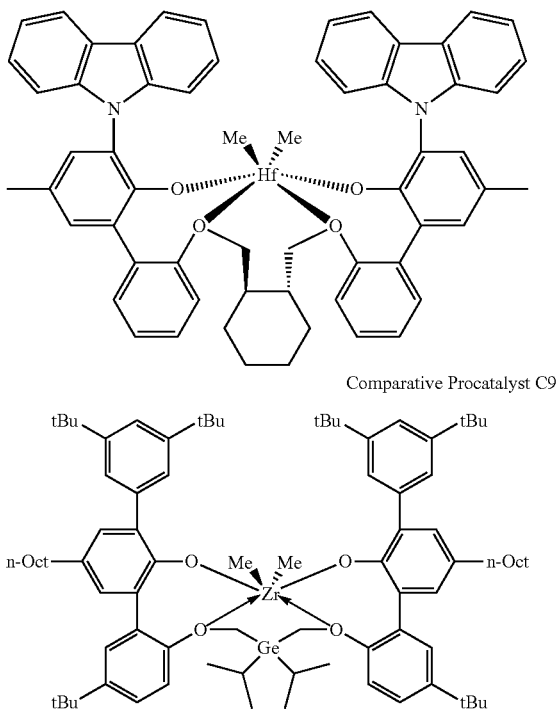

Comparative Procatalyst C8

Comparative Procatalyst C9

Polymerization reactions were carried out according to the conditions for a single-reactor system as previously described, in each of which reactions one of Procatalysts 1-7 or Comparative Procatalysts C1-C9 was added as the metal-ligand complex of the catalyst system. Properties for the resulting polymers are reported in Table 1 and Table 2.

TABLE 1

Batch Reactor Polymerization Data

| Procatalyst | Eff* (MM) | $T_m$ (° C.) | Density (g/mL) | MWD | Mw (g/mol) |
|---|---|---|---|---|---|
| Procatalyst 1 | 0.85 | 92.6 | 0.8924 | 2.19 | 1,227,636 |
| Procatalyst 2 | 1.55 | 94.1 | 0.8938 | 2.33 | 1,035,899 |
| Procatalyst 3 | 0.69 | 85.5 | 0.8891 | 2.23 | 1,035,899 |
| Procatalyst C1 (comparative) | 1.16 | 99.3 | 0.8972 | 2.32 | 891,110 |
| Procatalyst C2 (comparative) | 0.48 | 91.6 | 0.8927 | 2.06 | 925,983 |
| Procatalyst C3 (comparative) | 0.77 | 93.2 | 0.8929 | 1.92 | 903,908 |
| Procatalyst C4 (comparative) | 1.53 | 99.2 | 0.8966 | 2.45 | 1,173,134 |
| Procatalyst C5 (comparative) | 0.50 | 90.4 | 0.8937 | 2.17 | 1,064,021 |
| Procatalyst C6 (comparative) | 0.23 | 76.8 | 0.8863 | 2.11 | 744,254 |
| Procatalyst C7 (comparative) | 0.26 | 81.3 | 0.8891 | 1.93 | 730,874 |

Polymerization conditions: 1.47 Kg Isopar-E; 100 g octene; 100 g ethylene; temperature was 160° C.; total pressure was 410 psi; procatalyst: activator ratio was 1:1.2; activator was [HNMe(C$_{18}$H$_{37}$)$_2$][B(C$_6$F$_5$)$_4$]; MMAO was used as an impurity scavenger at a 50:1 molar ratio (Al:procatalyst); reaction time was 10 min.
*Efficiency (Eff) in units of 10$^6$ grams of polymer per gram of active metal (Zr or Hf) in the catalyst.

The procatalysts with an efficiency greater than 0.6 MM and that yield polymers with a melting temperature ($T_m$) less than 95° C., a molecular weight greater than 1,000,000 g/mol and a density less than 0.894 g/cc (grams per cubic centimeter) have the most desirable combination of proper-ties. Procatalysts 1-3 produced polymers that exhibited these characteristics and had an efficiency greater than 0.6 MM. Many of the Comparative Procatalysts C1-C7 had high efficiencies, but produced polymers with a low molecular weight or a higher melting temperature than what is desired, such as Procatalysts C1 and C4, which had an efficiency greater than 0.6 MM, but yielded a polymer that had a $T_m$ greater than 95° C.

TABLE 2

Miniplant Polymerization Data

| Procatalyst | Temp ° C. | Eff* | I$_2$ (g/10 min) | H$_2$ (mL/min) | I$_{10}$/I$_2$ | Density (g/mL) |
|---|---|---|---|---|---|---|
| Procatalyst 4 | 165 | 1.10 | 0.33 | 65 | 6.21 | 0.8973 |
| Procatalyst 5 | 165 | 0.95 | 0.28 | 59 | 6.32 | 0.8986 |
| Procatalyst 6 | 165 | 1.12 | 0.29 | 53 | 6.17 | 0.8993 |
| Procatalyst 7 | 165 | 1.05 | 0.26 | 60 | 6.46 | 0.8951 |
| Procatalyst C8 (comparative) | 165 | 1.80 | 0.28 | 200 | 8.11 | 0.8962 |
| Procatalyst C9 (comparative) | 165 | 1.1 | 0.27 | 52 | 6.33 | 0.9018 |

*Efficiency is defined in units of 10$^6$ grams polymer per gram of active metal (Hf or Zr). Feed rates were: solvent (27.4 kg/h), ethylene (3.62 kg/h), 1-octene (1.52 kg/h). The exit ethylene concentration was held constant at 9 g/L (87% conversion).

Polymerization reactions were carried out according to the conditions for a miniplant, as previously described, in each of which reactions one of Procatalysts 4-7 or Comparative C8-C9 was added as the metal-ligand complex of the catalyst system. The Procatalysts 4-7 had an alkyl group in the $B^1$ and $B^2$ positions and at least one fluorine atom in the $A^{1-2}$ and at least one fluorine atom in the $A^{3-4}$ position. Comparative Procatalysts C8-C9 had (1) a fluorine atom in the $A^{1-2}$ position and a fluorine atom in the $A^{3-4}$ position, (2) an alkyl in the $B^{1-2}$ positions, or neither the fluorine atom nor the alkyl. Procatalysts 4-7 yielded polymers with a density less than 0.900 g/cc and an $I_{10}/I_2$ ratio less than 6.5, while the Comparative Procatalysts C8-C9 produced polymers having a greater density or a greater $I_{10}/I_2$ ratio.

Thus, the catalyst systems incorporating metal-ligand complexes having both at least two fluorine atoms in the $A^{1-4}$ positions and an alkyl in the $B^{1-2}$ positions yielded polymers with a density less than 0.900 g/cc and an $I_{10}/I_2$ ratio less than 6.5. The catalyst systems that included Comparative Procatalysts C8-C9 produced a polymer with either a density greater than 0.900 g/cc or a $I_{10}/I_2$ ratio greater than 6.5.

Measurement Standards

Density

Samples that were measured for density were prepared according to ASTM D-1928, which is incorporated herein by reference in its entirety. Measurements were made within one hour of sample pressing using ASTM D-792, Method B, which is incorporated herein by reference in its entirety.

Melt Index

Melt index ($I_2$) was measured in accordance with ASTM-D 1238, which is incorporated herein by reference in its entirety, Condition 190° C./2.16 kg, and was reported in grams eluted per 10 minutes. Melt flow rate (10) was measured in accordance with ASTM-D 1238, Condition 190° C./10 kg, and was reported in grams eluted per 10 minutes.

Gel Permeation Chromatography (GPC)

The ethylene/alpha-olefin interpolymers were tested for their properties via GPC, according to the following procedure. The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors could include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors was sometimes referred to as "3D-GPC", while the term "GPC" alone generally refered to conventional GPC. Depending on the sample, either the 15-degree angle or the 90-degree angle of the light scattering detector was used for calculation purposes.

Data collection was performed using Viscotek TriSEC software, Version 3, and a 4-channel Viscotek Data Manager DM400. The system was equipped with an on-line solvent degassing device from Polymer Laboratories (Shropshire, UK). Suitable high temperature GPC columns could be used such as four 30 cm long Shodex HT803 13 micron columns or four 30 cm Polymer Labs columns of 20-micron mixed-pore-size packing (MixA LS, Polymer Labs). The sample carousel compartment was operated at 140° C. and the column compartment was operated at 150° C. The samples were prepared at a concentration of 0.1 grams of polymer in 50 milliliters of solvent. The chromatographic solvent and the sample preparation solvent contain 200 ppm of butylated hydroxytoluene (BHT). Both solvents were sparged with nitrogen. The polyethylene samples were gently stirred at 160° C. for four hours (4 h). The injection volume was 200 microliters (μL). The flow rate through the GPC was set at 1 mL/minute.

The GPC column set was calibrated before running the Examples by running twenty-one narrow molecular weight distribution polystyrene standards. The molecular weight (Mw) of the standards ranges from 580 to 8,400,000 grams per mole (g/mol), and the standards were contained in 6 "cocktail" mixtures. Each standard mixture had at least a decade of separation between individual molecular weights. The standard mixtures were purchased from Polymer Laboratories (Shropshire, UK). The polystyrene standards were prepared at 0.025 g in 50 mL of solvent for molecular weights equal to or greater than 1,000,000 g/mol and 0.05 g in 50 mL of solvent for molecular weights less than 1,000,000 g/mol. The polystyrene standards were dissolved at 80° C. with gentle agitation for 30 minutes. The narrow standards mixtures were run first and in order of decreasing highest molecular weight (Mw) component to minimize degradation. The polystyrene standard peak molecular weights were converted to polyethylene Mw using the Mark-Houwink constants. Upon obtaining the constants, the two values were used to construct two linear reference conventional calibrations for polyethylene molecular weight and polyethylene intrinsic viscosity as a function of elution column.

Measurement for Efficiency

The catalytic efficiency was measured in terms of amount of polymer produced relative to the amount catalyst used in solution polymerization process.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A catalyst system comprising a metal-ligand complex according to formula (I):

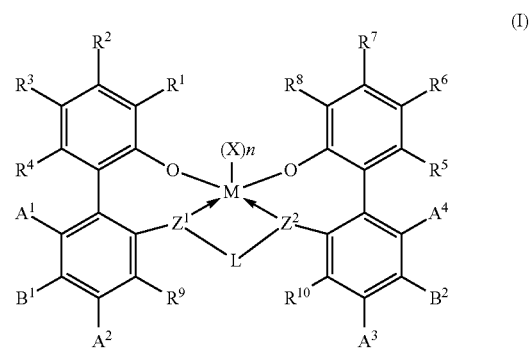

where:

M is a metal chosen from titanium, zirconium, or hafnium, the metal being in a formal oxidation state of +2, +3, or +4;

n is 0, 1, or 2;

when n is 1, X is a monodentate ligand or a bidentate ligand;

when n is 2, each X is independently a monodentate ligand;

the metal-ligand complex is overall charge-neutral;

each $Z^{1-2}$ is independently selected from —O—, —S—, —N($R^N$)—, or —P($R^P$)—; $R^1$ and $R^8$ are independently selected from —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen, radicals having formula (II), formula (III), or radicals having formula (IV):

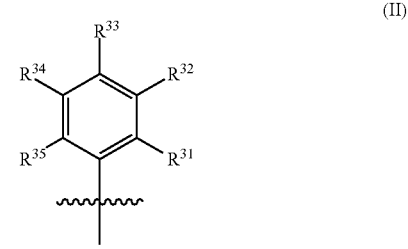

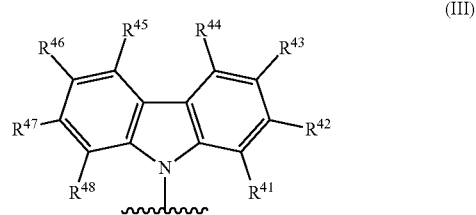

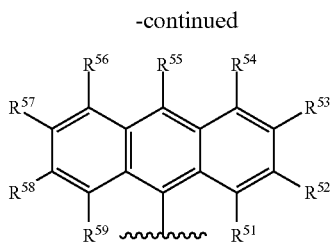

where each of $R^{31-35}$, $R^{41-48}$, or $R^{51-59}$ is independently selected from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —N=CHR$^C$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N$(R^N)$—, $(R^C)_2$NC(O)—, halogen, or —H, provided at least one of $R^1$ or $R^8$ is a radical having formula (II), a radical having formula (III), or a radical having formula (IV);

each of $R^{2-4}$, $R^{5-7}$, and $R^{9-10}$ is independently selected from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —N=CHR$^C$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N$(R^N)$—, $(R^C)_2$NC(O)—, halogen, or —H;

each of $A^{1-4}$ is independently selected from halogen or —H, provided at least one of $A^1$ or $A^2$ is halogen and at least one of $A^3$ or $A^4$ is halogen;

each of $B^{1-2}$ is independently selected from $(C_1-C_{40})$alkyl, —N$(R^N)_2$, —Si$(R^C)_3$, or —OR$^C$;

L is $(C_2-C_{40})$hydrocarbylene or $(C_2-C_{40})$heterohydrocarbylene; and each $R^C$, $R^P$, and $R^N$ in formula (I) is independently a $(C_1-C_{30})$hydrocarbyl, $(C_1-C_{30})$heterohydrocarbyl), or —H.

2. The catalyst system according to claim 1, wherein:
M is zirconium or hafnium;
each of $Z^1$ and $Z^2$ is oxygen; and
$R^1$ and $R^8$ are identical and are selected from the group consisting of radicals having formula (II), radicals having formula Me, and radicals having formula (PO.

3. The catalyst system according to claim 1, wherein at least one of $R^1$ or $R^8$ is a radical having formula (III), where at least one of $R^{43}$ or $R^{46}$ is tert-butyl and where $R^{41-42}$, $R^{44-45}$, and $R^{47-48}$ are —H.

4. The catalyst system according to claim 1, wherein at least one of $R^1$ or $R^8$ is a radical having formula (III), where at least one of $R^{42}$ or $R^{47}$ is tert-butyl and where $R^{41}$, $R^{43-46}$, and $R^{48}$ are —H.

5. The catalyst system according to claim 1, wherein at least one of $R^1$ or $R^8$ is a radical having formula (III); and both $R^{42}$ and $R^{47}$ are —H.

6. The catalyst system according to claim 1, wherein at least one of $R^1$ or $R^8$ is a radical having formula (III), where $R^{32}$ and $R^{34}$ are independently tert-butyl or 3,5-di-(tert-butyl)phenyl.

7. The catalyst system according to claim 1, wherein $R^3$ and $R^6$ are independently tert-octyl or n-octyl.

8. The catalyst system according to claim 1, wherein $R^3$ and $R^6$ are —Si$(R^C)_3$, where each $R^C$ is independently selected from methyl, butyl, n-octyl, or tert-octyl.

9. The catalyst system according to claim 1, wherein each of $A^{1-4}$ is halogen.

10. The catalyst system according to claim 1, wherein each of $B^{1-2}$ is tert-butyl.

11. The catalyst system according to claim 1, where L is —CH$_2$Ge$(R^{17})(R^{18})$CH$_2$—, wherein each $R^{17-18}$ are independently $(C_2-C_3)$hydrocarbyl.

12. The catalyst system according to claim 1, where L is —CH$_2$Ge$(R^{17})(R^{18})$CH$_2$—, where $R^{17}$ and $R^{18}$ are independently $(C_2-C_{30})$hydrocarbyl.

13. The catalyst system according to claim 12 where each $R^{17-18}$ are 2-propyl.

14. The catalyst system according to claim 12, where at least one of $R^{17R}$ or $^{18}$ is cyclopentyl or cyclohexyl.

15. The catalyst system according to claim 1, where L comprises a $(C_3-C_7)$alkyl 1,3-diradical.

16. The catalyst system according to claim 1, where the $(C_3-C_7)$alkyl 1,3-diradical is —CH(CH$_3$)CH$_2$C*H(CH$_3$).

17. A polymerization process for producing an ethylene-based polymer, the polymerization process comprising:
polymerizing ethylene and at least one additional α-olefin in the presence of a catalyst system according to claim 1, wherein the polymer exhibits:
a density from 0.850 g/cm$^3$ to 0.950 g/cm$^3$ according to ASTM D792;
a melt flow ratio (I$_{10}$/I$_2$) from 5-15, where melt index I$_2$ is measured according to ASTM D 1238 at 190° C. and 2.16 kg load, and melt index I$_{10}$ is measured according to ASTM D1238 at 190° C., and 10 kg load;
a molecular weight distribution (MWD) from 1 to 5, where MWD is a ratio of weight average molecular weight to number average molecular weight.

18. A polymerization process according to claim 17, wherein the catalyst system comprises at least one additional cocatalyst.

19. A polymerization process according to claim 17, wherein the MWD is from 1 to 3.

20. The polymerization process according to claim 18, wherein the catalyst system comprises a first catalyst and at least one additional catalyst, wherein the first catalyst is a catalytically activated form of the metal-ligand complex according to formula (I).

* * * * *

UNITED STATES PATENT AND TRADEMARK OFFICE
CERTIFICATE OF CORRECTION

| | |
|---|---|
| PATENT NO. | : 11,401,354 B2 |
| APPLICATION NO. | : 16/497613 |
| DATED | : August 2, 2022 |
| INVENTOR(S) | : Fontaine et al. |

It is certified that error appears in the above-identified patent and that said Letters Patent is hereby corrected as shown below:

In the Claims

Column 54, Line 18, Claim 12:
"-- -CH2Ge(R17)(R18)CH2-, where R17 and R18 are independently --"
Should read:
"-- -CH2Ge(R17)(R18)CH2-, wherein each R17-18 are independently --"

Column 54, Line 23, Claim 14:
"-- least one of R17Ror18 is cyclopentyl or cyclohexyl. --"
Should read:
"-- least one of R17 or R18 is cyclopentyl or cyclohexyl. --"

Signed and Sealed this
Twentieth Day of June, 2023

Katherine Kelly Vidal
*Director of the United States Patent and Trademark Office*